United States Patent
Rubin et al.

(10) Patent No.: US 8,099,144 B2
(45) Date of Patent: Jan. 17, 2012

(54) ELECTRONIC DEVICE WITH HINGE MECHANISM

(75) Inventors: Andy Rubin, Los Altos Hills, CA (US); Perry Anderson, Kensington, CA (US); Sung Kim, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 11/841,472

(22) Filed: Aug. 20, 2007

(65) Prior Publication Data

US 2009/0049646 A1 Feb. 26, 2009

(51) Int. Cl.
*H04M 1/00* (2006.01)

(52) U.S. Cl. ...................... 455/575.4; 16/358

(58) Field of Classification Search ............. 16/358, 16/347; 455/566, 575.1, 575.3, 575.4; 361/679.02, 361/681, 379
See application file for complete search history.

(56) References Cited

U.S. PATENT DOCUMENTS

| | | | |
|---|---|---|---|
| 6,504,707 B2 * | 1/2003 | Agata et al. ............. 361/679.05 |
| 6,829,139 B1 * | 12/2004 | Duarte .................... 361/679.02 |
| 7,003,104 B2 * | 2/2006 | Lee ......................... 379/433.13 |
| 7,016,182 B2 * | 3/2006 | Brandenberg et al. ... 361/679.06 |
| 7,065,835 B2 * | 6/2006 | Kuramochi ................... 16/357 |
| 7,082,028 B2 * | 7/2006 | Huilgol et al. ........... 361/679.07 |
| 7,107,084 B2 | 9/2006 | Duarte et al. |
| 7,142,420 B2 | 11/2006 | Santos |
| 7,278,184 B2 * | 10/2007 | Kuramochi .................. 16/357 |
| 7,580,726 B2 * | 8/2009 | Maatta et al. ............. 455/550.1 |
| 7,599,723 B2 | 10/2009 | Lee et al. |
| 2004/0062000 A1 * | 4/2004 | Duarte .......................... 361/683 |
| 2004/0145564 A1 | 7/2004 | Duarte et al. |
| 2005/0052837 A1 * | 3/2005 | Kota et al. .................... 361/683 |
| 2007/0032278 A1 * | 2/2007 | Lee et al. .................... 455/575.4 |
| 2007/0082718 A1 * | 4/2007 | Yoon et al. ................. 455/575.4 |
| 2007/0097607 A1 * | 5/2007 | Lee ............................... 361/679 |
| 2007/0270107 A1 * | 11/2007 | Vanska et al. ............... 455/90.3 |
| 2008/0051041 A1 | 2/2008 | Griffin et al. |
| 2008/0051161 A1 * | 2/2008 | Tashiro .................... 455/575.1 |
| 2008/0261659 A1 * | 10/2008 | Jang et al. ..................... 455/566 |
| 2008/0274776 A1 * | 11/2008 | Cho et al. .................. 455/575.4 |
| 2009/0011802 A1 * | 1/2009 | Malthe et al. ............. 455/575.1 |
| 2009/0069058 A1 * | 3/2009 | Taschke ..................... 455/575.4 |

FOREIGN PATENT DOCUMENTS

| | | |
|---|---|---|
| EP | 1217501 A2 | 6/2002 |
| EP | 1501260 A1 | 1/2005 |
| EP | 1524820 A2 | 4/2005 |
| KR | 10-2005-0028666 A | 3/2005 |

(Continued)

OTHER PUBLICATIONS

Machine Translation of KIPO Application No. 10-0039528 Chang-Yong Jang Publication Date—Oct. 28, 2010.*

(Continued)

*Primary Examiner* — Victor Batson
*Assistant Examiner* — Matthew Sullivan
(74) *Attorney, Agent, or Firm* — Fish & Richardson P.C.

(57) ABSTRACT

An electronic device is described that has a base and a lid, where device can be opened so that part of the base is exposed and closed so that the same part of the base is hidden. The lid is connected to the base by two bars. The bars allow the lid to slide in a plane parallel to the base. The connection between the base and lid is such that there is little overlap between the base and the lid when the device is open.

31 Claims, 15 Drawing Sheets

FOREIGN PATENT DOCUMENTS

| KR | 10-2005-0101652 A | 10/2005 |
|---|---|---|
| KR | 10-2005-0108671 A | 11/2005 |
| KR | 10-2005-0109643 A | 11/2005 |
| KR | 10-2006-0109578 A | 10/2006 |
| KR | 10-2007-0031127 A | 3/2007 |

OTHER PUBLICATIONS

LG Verizon V Cast Mobile TV Phone, Model: VX9400. [online] LG Electronics, 2007 [retrieved on Jan. 18, 2008]. Retrieved from the Internet: <URL: http://us.lge.com/products/model/detail/mobile%20phones_select%20by%20carrier_verizon_VX9400.jhtml>, 7 pp.

International Search Report and Written Opinion of the International Searching Authority, International Application Serial No. PCT/US2008/073596, Mar. 9, 2009, 11 pp.

Supplementary European Search Report (3 pages), mailed Aug. 23, 2010 for related international application 08798189.0.

\* cited by examiner

ELECTRONIC DEVICE WITH HINGE MECHANISM

BACKGROUND

This disclosure relates to electronic communication and computation devices.

Mobile communications and computation devices have undergone significant technological advancement. Over time, the battery and electronics for such devices, e.g., phones, have become considerably smaller, allowing the devices to also become much smaller. Devices that were once bulky are now small enough to fit in a user's hand, providing a convenient hand-held phone or communications device. Additionally, the devices themselves have become more sophisticated. Some devices do not simply provide standard telephone services, but also provide electronic messaging capabilities, cameras, storage, multimedia display and other entertainment capabilities. Exemplary devices include personal digital assistants (PDA's). Some PDA's or mobile telephones have a screen and a small numeric or alphanumeric keyboard on a base that has no moving parts, other than buttons or scroll wheels. Other PDA's or telephones have moving parts, such as in so-called flip phones, where a screen and buttons are revealed when a bottom portion of the phone is rotated away from a top portion of the phone, and in a device called the Sidekick®, available from T-Mobile, which has an screen that overlaps a keyboard in a base and pivots around and away from a base to reveal the keyboard. Consumers now demand a greater number of features, user friendliness and compact size all within one hand-held device.

SUMMARY

In some embodiments, an electronic device is described. The device has a base, a lid and a connector between the base and the lid. The connector has two bars. The lid is moveable between a first position and a second position, when the lid is in the first position the lid covers at least a portion of the base and when the lid is in the second position, the portion of the base is exposed. As the lid moves from the first position to the second position, the lid moves in a plane parallel to a main surface of the base.

In some embodiments an electronic device is described having a base and a cover. The base has an upper surface, a lower surface, a width, a length, and a height. The height changes along the length forming a thin region and a thick region, wherein the upper surface in the thin region is not co-planar with the upper surface in the thick region and the thick region has an input control for controlling the electronic device. The cover has a length and a width. The cover is slidably connected the base such that in a first position at least 90% of a lower surface of the cover is adjacent to the upper surface of the thin region and in a second position at least 75% of the lower surface of the cover is not adjacent to the upper surface of the thin region.

In yet another embodiment, a method of forming an electronic device is described. A based is formed. A lid is connected to the base with a connector. The connector has two bars and permits the lid to move between a first position and a second position so that when the lid is in the first position the lid covers at least a portion of the base and when the lid is in the second position, the portion of the base is exposed and as the lid moves from the first position to the second position, the lid moves in a plane parallel to a main surface of the base.

In yet another embodiment, a method of forming an electronic device is described. A base having an upper surface, a lower surface, a width, a length, and a height is formed, where the height changes along the length forming a thin region and a thick region, the upper surface in the thin region is not co-planar with the upper surface in the thick region and the thick region has an input control for controlling the electronic device. A cover is connected to the base. The cover has a length and a width and is slidably connected the base such that in a first position at least 90% of a lower surface of the cover is adjacent to the upper surface of the thin region and in a second position at least 75% of the lower surface of the cover is not adjacent to the upper surface of the thin region.

Embodiments of device and methods described herein may include one or more of the following features. The two bars can be pivotable in a plane parallel to the main surface of the base. One bar of the two bars can include a bend. One bar of the two bars can be linear. A spring can be within the lid. The spring can be serpentine. When the lid is between the first position and the second position, the spring can be compressed. The device can have a spring within the base. The spring can be connected to one of the two bars. Moving the lid from the first position to the second position can cause the spring to extend. The device can have a link to stabilize the lid as the lid is moved relative to the base. The link can have a first end pivotably connected to the lid and a second end pivotably connected to the base, wherein the end pivotably connected to the base is slidably connected to the lid. The device can be configured so that the end slidably connected to the lid slides in an arc-like motion. The two bars pivot in a scissor-like motion as the lid is moved with respect to the base. The lid can include a display. The base can include a keyboard. The base includes a speaker. The input control can be configured to send electronic signals to control the device. When the cover is in both the first position and the second position, a center line along the length of the cover can be parallel with a center line along the length of the base. When the cover is in both the first position and the second position a center line along the width of the cover can be parallel with a center line along the width of the base. The cover can be slidable along a plane parallel to a plane of the base. The cover can be prevented from rotating out of the plane parallel to the plane of the base. The first position can be a fully closed position and the second position can be a fully open position and the cover and base may not move through a singularity point when transitioning from the first position to the second position. When the cover is moved from an open position to a closed position, a centerline of the cover along the width may not rotate with respect to a centerline of the base along the width. Forming the device can include connecting a stabilizing link to the lid and the base. Forming the device can include connecting a spring to the lid and the base.

The devices described herein may include one or more of the following advantages. An electronic device with a lid and base can provide access to a user input device on the base when desired by shifting the lid's position and hide the user input device, protecting the device from receiving undesired input, when the input device is not needed by shifting the lid's position into a closed position. Such a device can also have an improved form factor, that is, a smaller footprint when closed and larger comparative footprint when open, than a device with similarly sized features, e.g., a screen and user input device, that open and close. Hinges between the lid and base can enable the opening and closing action of the device. The hinges may be arranged in a way that minimizes the overlap between the base and lid when the device is open. The hinges can also provide stability to the device when the device is being opened or is in the open state. A stabilizing bar can be included in the device, which can further stabilize the lid when being opened or closed. Device stability can improve the feel of the device to the user. Device stability can also improve the robustness of the device and thereby improve the useful lifetime of the device. The hinges can be partially embedded in the lid and/or base. The embedding can protect a user's fingers from being pinched by the hinges. The embedding can also protect the hinges from debris. If the hinges are kept clean, the smooth action of hinges in motion can be preserved, further improving the user's tactile experience with the device and improving the useful life of the device. In devices that are provided with a spring, the lid can be positively held in the open or closed position. Holding the lid closed prevents the device from sliding open when it is desired to keep the device closed. Holding the lid open allows the user to use the device without having the device flip closed. The device may be more robust than other communication devices with moving parts, thereby providing a longer life for the device. The device can have a screen and input device portion that are parallel to one another, making using the keys and viewing the screen at a comfortable viewing angle easier than with other devices, such as flip phones, which tend not to have a parallel screen and input device portion when fully opened. Further, a larger keyboard area may be provided in a similarly sized device as with other devices, such as the so call flip phone.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements. All references to the top, bottom, left and right in the descriptions are with respect to the viewer's perspective of the related figures.

DETAILED DESCRIPTION

Figure 1:
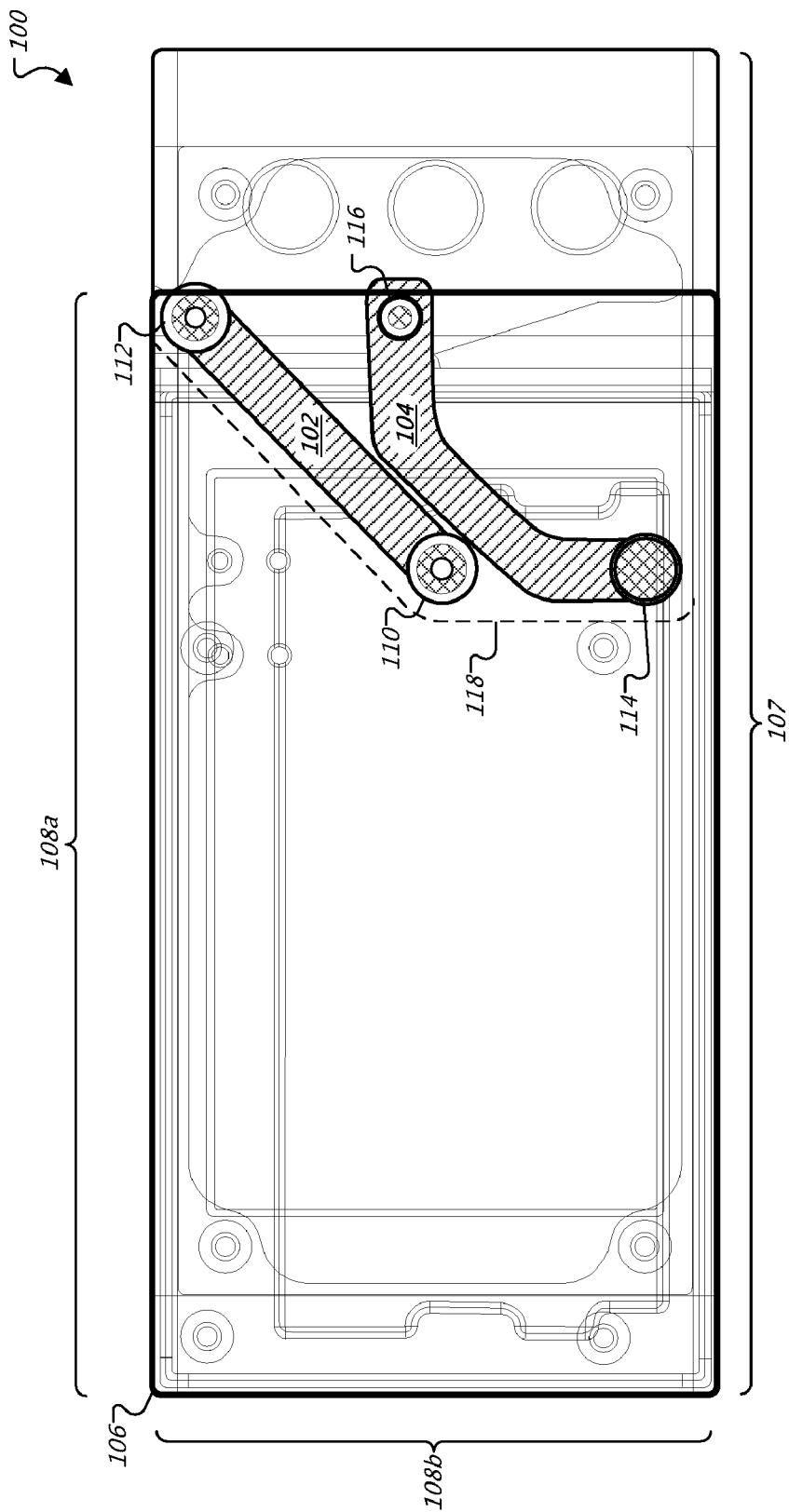
FIG. 1 is a schematic top view of a four-bar hinge mechanism in an electronic device in a closed position.

FIG. 1 is a schematic top view of a four-bar hinge mechanism in an electronic device 100 in a closed position. The electronic device 100 can be a communications device, such as a mobile telephone or a personal digital assistant (PDA), a gaming device, a generalized computing device or other electronic device. The electronic device 100 can provide wireless network connectivity, e.g., Wi-Fi or WWAN), which can provide e-mail and Internet access, conventional applications, such as calendar and contact lists, and portable media player capabilities. The electronic device 100 can include a base and an attached lid. The top surface of the lid can include a display screen such as a light emitting diode (LED) or liquid crystal display (LCD) display screen. The top surface of the base can include one or more user input devices, such as a standard keyboard, a thumb-type mini keypad, a touch pad, buttons, such as a mouse button, knob, a microphone or other means for input. Optionally, the device can have a second or third display, such as on a bottom surface of the base or on a top surface of the base. The base can also include a speaker. The user input device can be covered by the lid when the user input device is not needed. When access to the user input device is required, the lid can be slid from a closed position to an open position, exposing the user input device. The electronic device 100 can provide a user with functionality, such as text messaging, email, Internet access, and the ability to send and receive photos and video. The electronic device 100 can house one or more power sources, such as a battery pack/chamber, solar-powered cells, or a jack for accepting power from an external source.

Figure 1A:
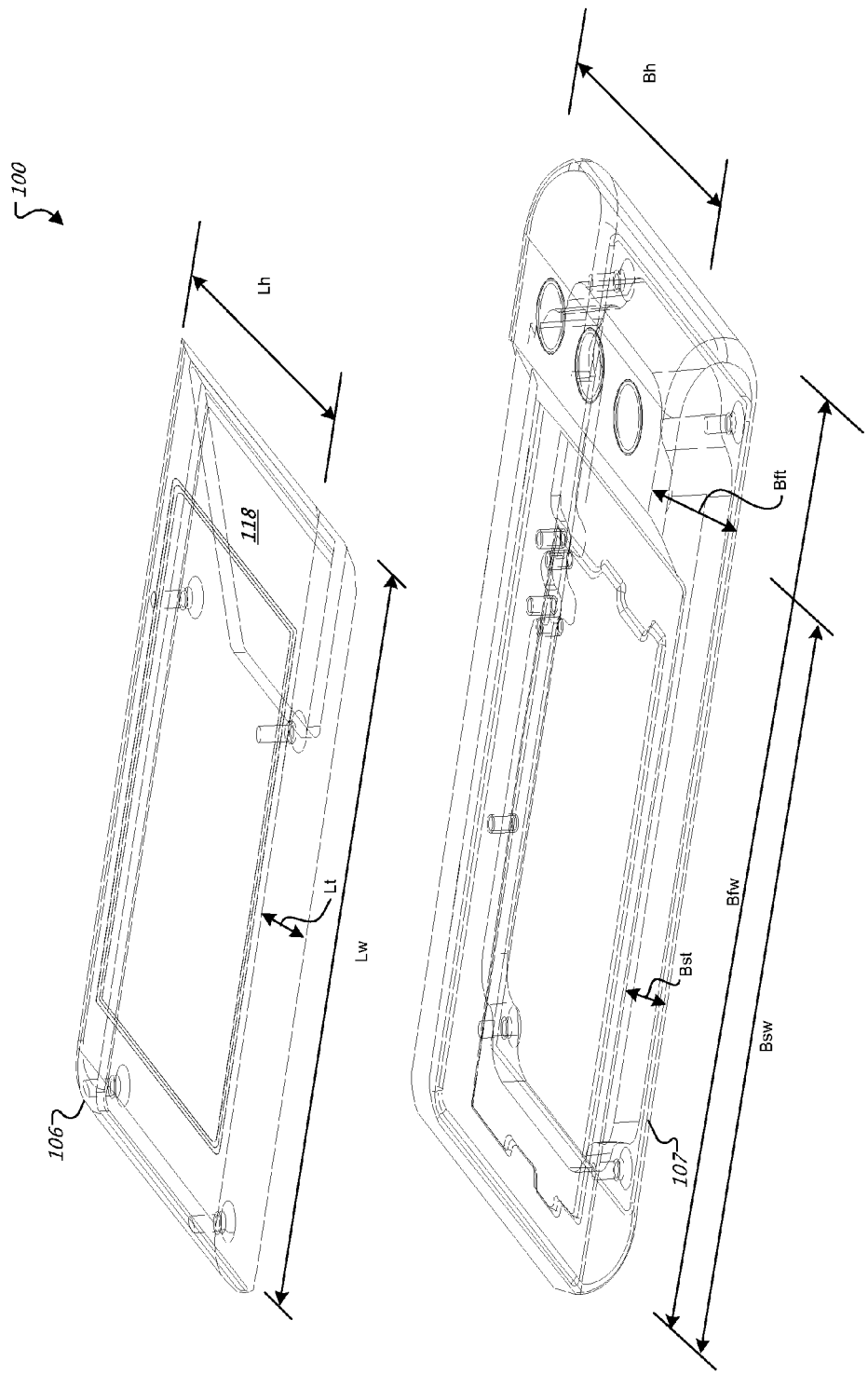
FIG. 1A is a schematic exploded perspective view of an electronic device.

Referring to FIG. 1A, an exploded view of a communications device, the device has a lid 106 and a base 107. The display screen in the lid 106 presents a graphical user interface (GUI) to the user. The GUI can be oriented horizontally or vertically, or can change from vertical to horizontal as the device is opened or closed. When the device is opened, the display can be turned on or brightened from a dim state. A button, switch or other input device on the lid 106 or base 107 can control the display in the lid 106, so that the display can be turned off or down when the device is not in use or on or up when the device is closed and the user want to view the GUI. The base 107 can have one or more buttons or other input means that are exposed whether the lid 106 is covering the base 107 or is in the open position. Other input means are on the base 107 and are covered by the lid 106 when the lid 106 is in a closed position. When the lid 106 is in an open position, the input means on the base 107 are conveniently located for a user to depress with their thumbs or fingers.

The lid has a thickness Lt, a width Lw and a height, Lh. The base has a thickness of Bst in the region that can be covered by the lid that is less than a thickness of the base Bft in the region that is not covered by the lid. The thickness of the lid Lt plus the thickness of the base in the region that is covered by the lid Bst can be equal to the thickness of the base in the region that is never covered by the lid Bft. This allows the top of the lid to be flush with the top of the portion of the base that is not covered when the device is closed. The height of the lid Lh can be equal to the height of the base Bh. The width of the lid Lw can be less than the full width of the base Bfw, but equal to the width of the portion of the base that is covered by the lid Bsw when the device is closed. Thus, when the device is closed, the edges of the lid do not extend over the edges of the base. In some embodiments, the lid includes a beveled end on a side adjacent to the base. The base between the thick region and the thin region has a complimentary beveled surface that mates with the beveled end of the lid.

When in an open position, the lid of the device described herein can overlap the base by a small amount. In some embodiments, the device has a width of about 5.6 cm when closed. When the device is in the open position, the device has an overall width of about 9.9 cm and the overlap between the display and user input device, e.g., a qwerty key pad, is about 1.25 cm. This can allow for a large ratio of usable input device space. Either one or both of the top surfaces of the base, Bst and Bft, can have input controls, such as buttons or touch pads. If controls are on the region of the base that is never covered by the lid Bft, even when the lid is covering the base, controls are accessible to a user.

Referring back to FIG. 1, the electronic device 100 is referred to as a four-bar hinge mechanism herein, because the lid 106 and base 107 act as two of the four-bars and upper bar 102 and lower bar 104 act as the remaining two bars. The upper bar 102 and lower bar 104 connect the lid 106 to the base 107. The lid 106 and the base 107 are depicted in FIG. 1 (and in subsequent figures) as transparent so that the locations of the underlying mechanisms can be seen. The bars 102 and 104 are able to pivot simultaneously. The bars 102 and 104 can be parallel to one another. The bars 102 and 104 can pivot so that the lid 106 and the base 107 occupy parallel, or nearly parallel, planes. In this way, the bars pivot and operate smoothly as they swing in relatively the same direction. Brackets 108a and 108b indicate the dimensions of the lid 106 that moves relative to the base 107.

The upper bar 102 includes a left pivot 110 and a right pivot 112. Similarly, the lower bar 104 includes a left pivot 114 and a right pivot 116. The left pivots 110 and 114 are attached to the lid 106. The right pivots 112 and 116 are attached to the base 107. Region 118 (shown in phantom) depicts a left boundary of an area inside of the lid 106 in which the bars 102 and 104 can freely rotate. In some embodiments, region 118 represents a void, recess or other opening inside of the lid 106 where the left portions of the bars 102 and 104 are connected to the lid 106 and the bars' remaining portions can move freely. Whenever the lid 106 is moved relative to the base 107, such as when the device 100 is opened or closed, the pivots 110-116 operate simultaneously. During this time, although the left pivots 110 and 114 remain rotatably fixed within the region 118, the position of the bars 102 and 104 change within the region 118.

In some embodiments, the pivots 110, 112, 114 and 116 are positioned so that their centers form a parallelogram, as depicted in FIG. 1. Specifically, to form the parallelogram, the distance between the centers of the left pivots 110 and 114 is the same as the distance between the centers of the right pivots 112 and 116. Also, the bars 102 and 104 have the same "lengths," as measured by the distance between the centers of their associated left/right pivots. Pivots that form a parallelogram have the advantage of keeping the lid 106 oriented similarly relative to the base 107 as the electronic device 100 is opened and closed. That is, the lid 106 can remain parallel to the base 107 in the closed position of the device 100, as well as in partially open and fully open positions.

In some implementations, different variations of the four-bar linkage can be used such that the centers of the pivots do not form a parallelogram. For example, if the bars 102 and 104 have different lengths, opening the device 100 will turn the lid 106 at a revolving angle relative to the device 100. Such a feature may be useful, for example, in a device (e.g., of non-rectangular shape) in which the fully open position of the lid 106 is at a different angle than the fully closed position.

Bars 102 and 104 can be constructed of a rigid material metal, such as steel, e.g., tempered steel or stainless steel, aluminum, titanium, plastic, or other suitable material. Specifically, the particular material used can be strong enough to provide a sturdy four-bar linkage but relatively thin enough to fit inside of the lid 106. At the same time, the four-bar linkage of the device 100 can be rigid enough to maintain its shape and orientation while being opened and closed. For example, if strong metal (e.g., steel) is used for making the bars 102 and 104, the bars' thickness can be approximately one-sixteenth of an inch. Thinner bars can be used, for example, when the stress over time is not likely to damage the bars. Thicker bars can be used, for example, in devices 100 that may be opened more often or that are intended to have a longer life span, such as several years. Additional bar strength can be realized by making the bars 102 and 104 wider. For example, although the bars depicted in the device 100 of FIG. 1 can be between about one-eighth and one-half inch wide, the dimensions of the bars 102 and 104 can be scaled to the size of the device 100 and the anticipated stress and wear on the four-bar linkage during repeated use over time. The bars can be formed by sheet metal stamping, forging and/or machining.

In addition to considerations regarding the strength of the bars 102 and 104, similar considerations can apply to the areas of the lid 106 and the base 107 where the bars 102 and 104 are attached at their pivots. Specifically, the pivots 110, 112, 114 and 116 can be mounted in reinforced or otherwise strengthened areas of the lid 106 and the base 107. For example, the area of the lid 106 surrounding and between the pivots can be engineered so that this component part of the four-bar linkage maintains its shape. Such engineering considerations of these areas of the lid 106 and the base 107 can provide the strength needed to maintain the four-bar linkage of the device 100 throughout movement to various positions.

Pivots 110, 112, 114 and 116 can be constructed using a pivot mechanism, such as a pivot pin assembly that is sealed and lubricated, a ball and socket mechanism, journal bearings or pin and shaft bearings, roller bearings or other suitable component that allows the bars to pivot. The components can include materials such as metal, plastic, etc. Minimizing the size of the right pivot 112 can reduce the size of the overlap needed between the lid 106 and the base 107. This can provide the advantage of exposing a greater percentage of the underlying base and the user input device it contains.

Figure 2:
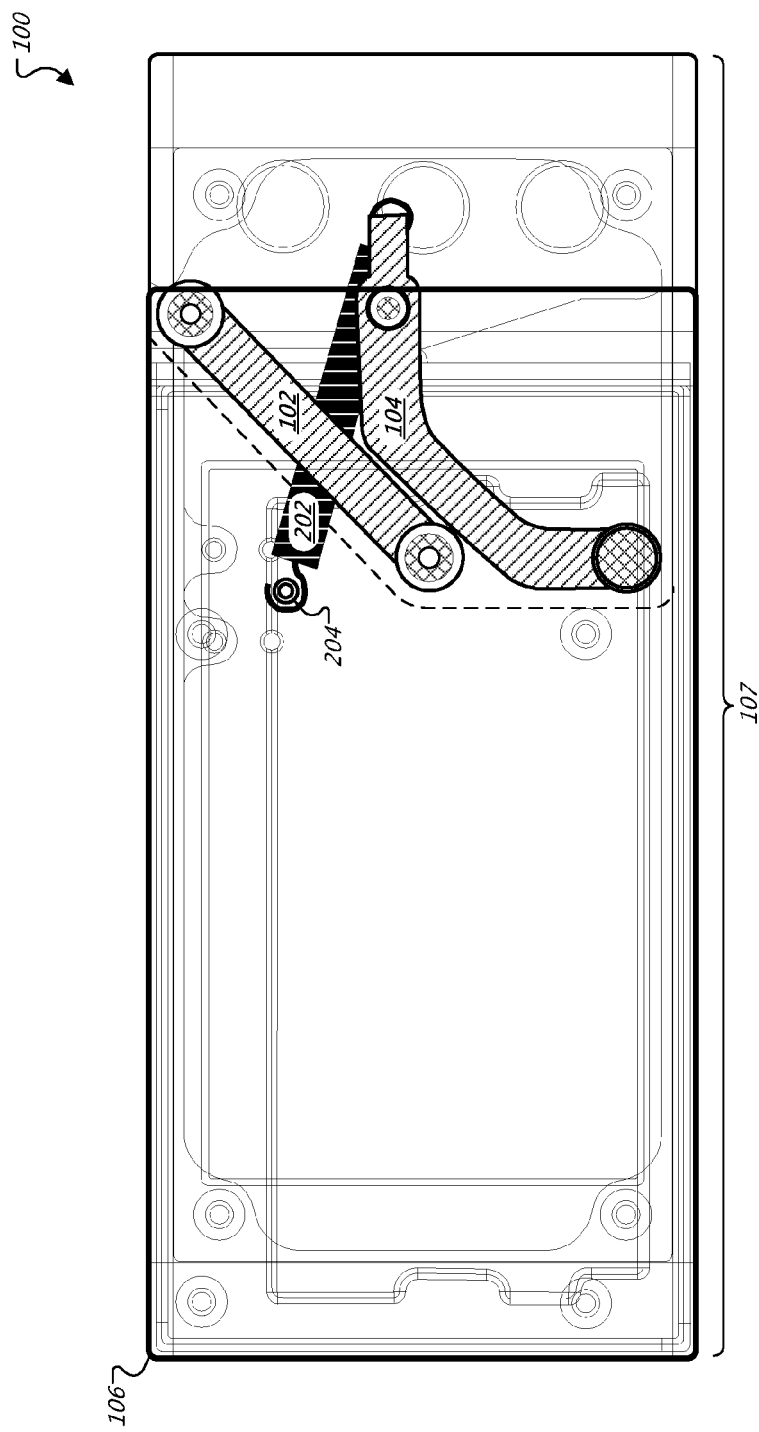
FIG. 2 is a schematic top view of an electronic device with a spring.

FIG. 2 is a schematic top view of electronic device 100 with a spring 202. The spring 202 can be an expansion or compression type spring. Including the spring 202 can provide a positive open and close operation of the lid 106 relative to the base 107. Specifically, the spring 202 can be attached in such a way as to pull the device 100 into a fully open or fully closed position. This can occur, for example, if the tension on the spring 202 is higher at a partially open position (e.g., half open) and significantly less at the fully open and fully closed positions. With an expansion spring, which wants to contract, the attachment points are selected so that the distance between the points is smaller when the device is open and closed than when the device is partially open. With a compression spring, which wants to expand, the attachment points are selected so that the distance between the points is greater when the device is open and closed than when the device is partially open. In some implementations, additional springs and/or mechanisms can be added to the device 100 so as to make the device 100 feel as though the lid 106 is snapping into place either to a fully open or fully closed position.

The spring 202 depicted in FIG. 2 is a tension coil spring. In some embodiments, a post 204 is embedded in the base 107 and one end of the spring is secured to the post 204. Another end of the spring is secured to a portion of bar 104 that extends past pivot 116 so that the right side of the spring is moved when the lid 106 is opened and closed. The areas in which the spring 202 is attached to the base 107 can be engineered such that they absorb the stress caused by repeated use of the spring 202 over time.

In some embodiments, when the lid 106 is completely closed (e.g., as depicted in FIG. 2), the spring 202 is in a generally un-stretched state. Some significant but slight tension in the spring 202 generally can be beneficial in this position so as to complete the positive close action. Similarly, in a fully open position of the lid 106 (described below in reference to FIG. 6), a slight but significant force in the spring can help to keep the lid 106 fully open. This spring tension in the fully open position also can keep the entire user input device exposed when the lid 106 is moved away from the base 107. In the fully open position, the left ends of the bars 102 and 104 are typically closer to the right end of the spring 202 than they are, for example, when the lid 106 is approximately half open.

The highest tension in the spring 202 can occur in a partially open state of the lid 106. This can occur, for example, when the bars 102 and 104 are approximately parallel with the top edge of the base 107 (and the lid 106), thereby pulling the spring to its maximum length. However, depending on the precise location of the right end of the spring 202, the maximum tension in the spring 202 may actually occur when the lid 106 is open slightly more than that, as such additional upward motion can lengthen the spring 202. The anticipated forces of the spring 202 in various positions can determine where to place the spring 202. The desired functionality of the device can be used to determine whether the device should be biased to a harder opening or harder closing.

The spring 202 can be manufactured, for example, using metal (e.g., tempered steel, titanium) having flexibility, tensile strength and memory needed for repeated expansion and contraction of the spring 202. PTFE, e.g., Teflon®, or other suitable coatings may be used where the spring 202 connects to the post 204. Sealed lubricated fittings may be included in the post 204 assembly.

Figure 3:
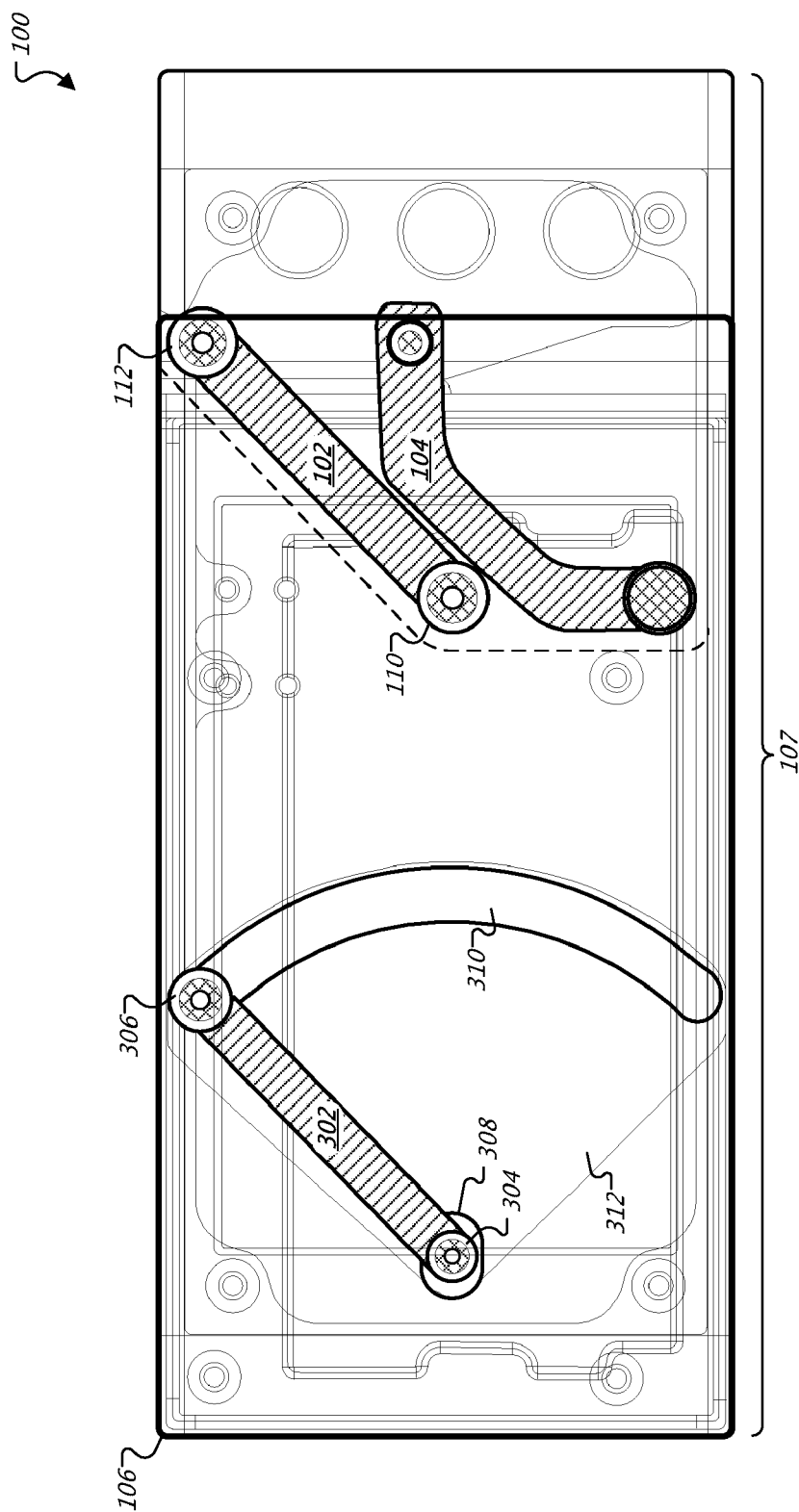
FIG. 3 is a schematic top view of an electronic device with a stabilizing link.

FIG. 3 is a schematic top view of an electronic device 100 with a stabilizing link 302. Using the stabilizing link 302 or a similar hinge opposite the four-bar linkage can provide stability to the lid 106 when it is in various open positions. That is, the stabilizing link 302 provides stability against out of plane loading. The stabilizing link 302 can also help to hold the lid 106 in the appropriate position on the base 107 when the lid 106 is closed. Specifically, the stabilizing link 302 can provide stability at the left side of the device 100 while bars 102 and 104 provide stability at the right side.

The stabilizing link 302 includes a left pivot 304 and a right slidable fastener 306. The left pivot 304 is pivotally attached to the lid 106. The right slidable fastener 306 is connected to the base 107. The right slidable fastener 306 can slide within a channel 310 in the lid 106. In some embodiments, the pivot and slidable fastener are dumbbell shaped to provide for freedom of movement, i.e., pivoting, as well as security, i.e., connection to the device. The wide portion of the dumbbell is wider than the width of opening to the channel 310, that is, the slidable fastener 306 can engage the edges of the channels, which prevents the slidable fastener 306 from being released from the channel 310. Pivot 304 and slidable fastener 306 operate in the same general plane, but can be slightly offset (e.g., operating in parallel planes) if the stabilizing link 302 extends upward or downward into the base 107. Such a coplanar orientation of the stabilizing link 302 with respect to the base 107 may be necessary, for example, to accommodate any spacing between the lid 106 and the base 107. The left pivot 304 is housed in an oval channel 308 which is in the lid 106. The oval channel 308 can provide adequate left-to-right tolerance to the left pivot 304 so that operation of the lid 106 can be smoother and less stiff. The tolerance can provide some play, for example, for the left pivot 304 to fit into the lid 107 without actually being attached to the lid 107. The pivot 304 can engage the edges of oval channel 308.

The right slidable fastener 306 of the stabilizing link 302 is housed in an arc-shaped channel 310. The lid 106 can have the arc-shaped channel 310 built into its bottom surface so that the right slidable fastener 306 can slide through various positions of the channel 310 when the lid 106 is opened. The arc-shaped path of the right slidable fastener 306 is relative to the fixed position (i.e., within the lid 106) of the left pivot 304. The top part of the right slidable fastener 306 slides within the arc-shaped channel 310 in different positions depending on whether the lid 106 is fully closed, partially open, or fully open. The sliding occurs while the right pivot 306 is anchored to the base 107. For instance, as depicted in FIG. 3, when the lid 106 is fully closed, the top part of the right slidable fastener 306 occupies a position in the arc-shaped channel 310 that is at or near the top of the channel 310. When the lid 106 is partially (e.g., nearly half or more) open, the top part of the right pivot 306 occupies a generally central position in the arc-shaped channel 310. When the lid 106 is fully open, the top part of the right slidable fastener 306 occupies a position at or near the bottom of the arc-shaped channel 310. During these various positions of the lid 106, the stabilizing link 302 swings freely (in a predefined plane) within a pie-shaped region 312 as the relative positions of pivot 304 and slidable fastener 306 change. The region 312 can be, for example, a void or other empty space within the lid 106 in which the stabilizing link 302 can move while the lid 106 is opened and closed. A cover on the back of the region 312 protects a user's fingers from being pinched by the stabilizing link as well as protects the mechanism from becoming dirty and gumming up, limiting its smooth action.

In some embodiments, the stabilizing link 302 is parallel to and has the same length as bar 102. In this way, a parallelogram can be formed, for example, by the centers of the pivot 304 and slidable fastener 306 in the stabilizing link 302 and the centers of the pivots 110 and 112 in the bar 102. As such, the distance between the centers of the left pivots 304 and 110 equals the distance between the centers of the right slidable fastener 306 and pivot 112. Having pivots that form a parallelogram has the advantage of keeping the lid 106 parallel to the base 107 (as mentioned in reference to FIG. 1).

The stabilizing link 302 can be constructed of metal or other suitable strong, rigid materials. The pivot 304 can include pivot mechanisms, such as those described above with respect to pivots 110-116. The top of the slidable fastener 306 that slides through the arc-shaped channel 310 can be made primarily of metal or plastic and may include a gasket or washer (e.g., made of rubber or other cushion material) to absorb the stress of opening and closing the lid 106.

In some embodiments, the slidable fastener 306 does not include the link 302 and is simply a projection that is slidable in channel 310, forming a slidable attachment point between the lid 106 and the base 107. In some embodiments, the slidable fastener 306 and bar 302 are replaced by a sliding bearing located where fastener 306 is shown.

Figure 4:
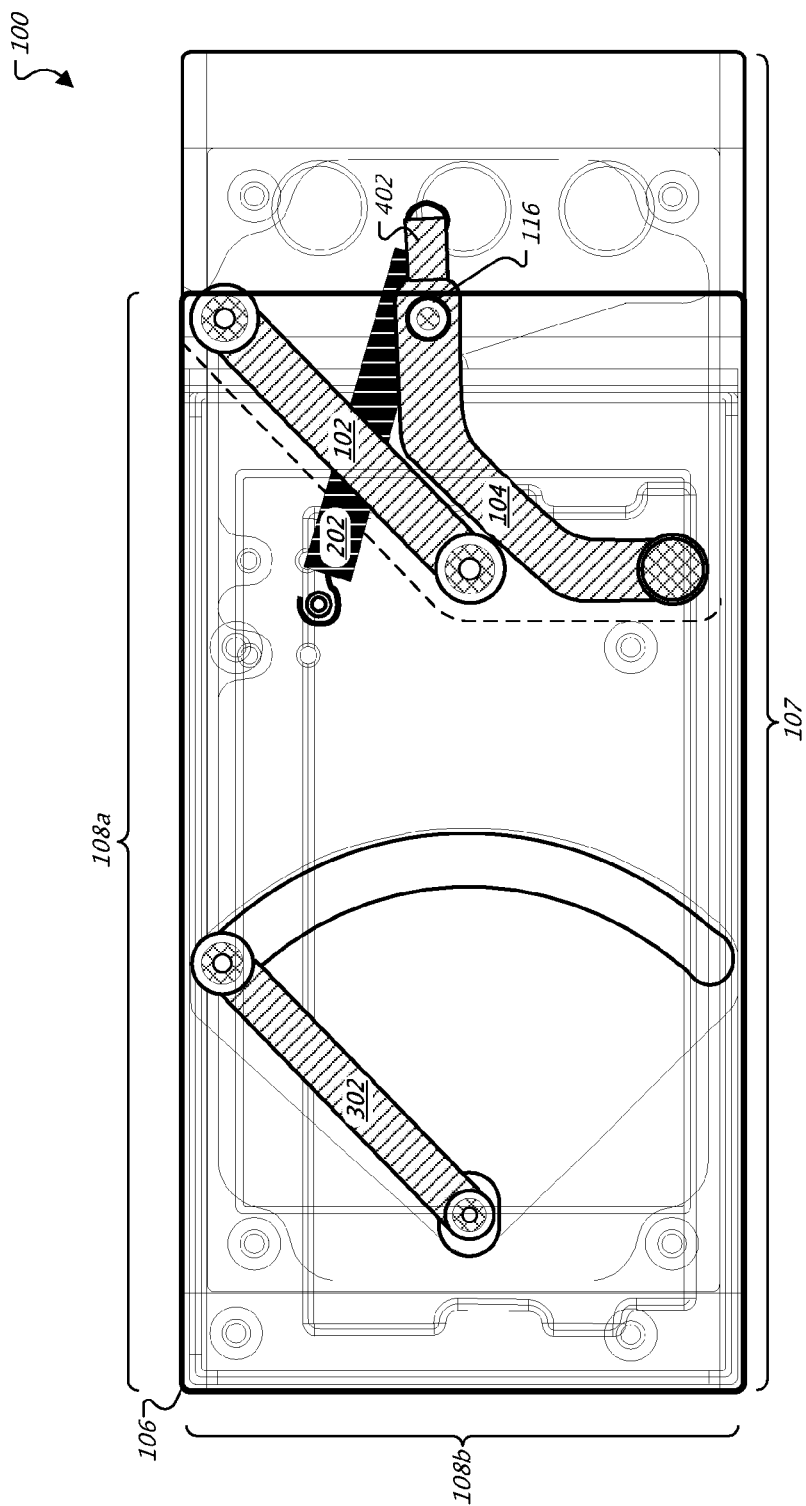
FIG. 4 is a schematic top view of an electronic device with a spring and stabilizing link.

FIG. 4 is a schematic top view of an electronic device 100 with a spring 202 and stabilizing link 302. Having both features can provide positive open and close operations as well as a generally more stabilized lid 106. Specifically, the spring 202 can make it easier to open and close the lid 106, as described in reference to FIG. 2. Simultaneously, the stabilizing link 302 can stabilize the connection between the lid 106 and the base 107, as described in reference to FIG. 3.

The bar 104 depicted in FIG. 4 also includes an extender 402. The extender 402 can provide an anchor for the spring 202. The extender 402 can be, for example, part of (or attached to) the bar 104, essentially serving to extend the bar 104 farther past its right pivot 116. The spring pivots around the right side of the extender 402. Connecting the spring 202 to the extender 402 stretches the spring as the extender bar is rotated around the right pivot 116. Specifically, the extender 402 extends the spring 202 as the left side of the bar 104 moves upward and the extender 402 moves downward (e.g., when the lid 106 is opened).

The extender 402 can be of the same material (e.g., metal, etc.) as the bar 104. The part of the extender 402 that contacts the right end of the spring 202 can be a pivoting post and/or it can be lubricated in such a way as to prevent damage from repeated use over time.

FIG. 4 also illustrates that one or more bends in bar 104 allows the bar to be positioned so that the bar overlaps the exposed portion of the base as little as possible. Bar 104 is shown with three straight sections and two bends, although the bar could also be formed in an arc. The central straight portion of the bar 104 remains parallel to the bar 102 throughout the opening and closing actions. The straight portions of the bar 104 allow most of the bar to remain hidden under the lid 106 or in the base 107 when the device 100 is open.

Figure 5:
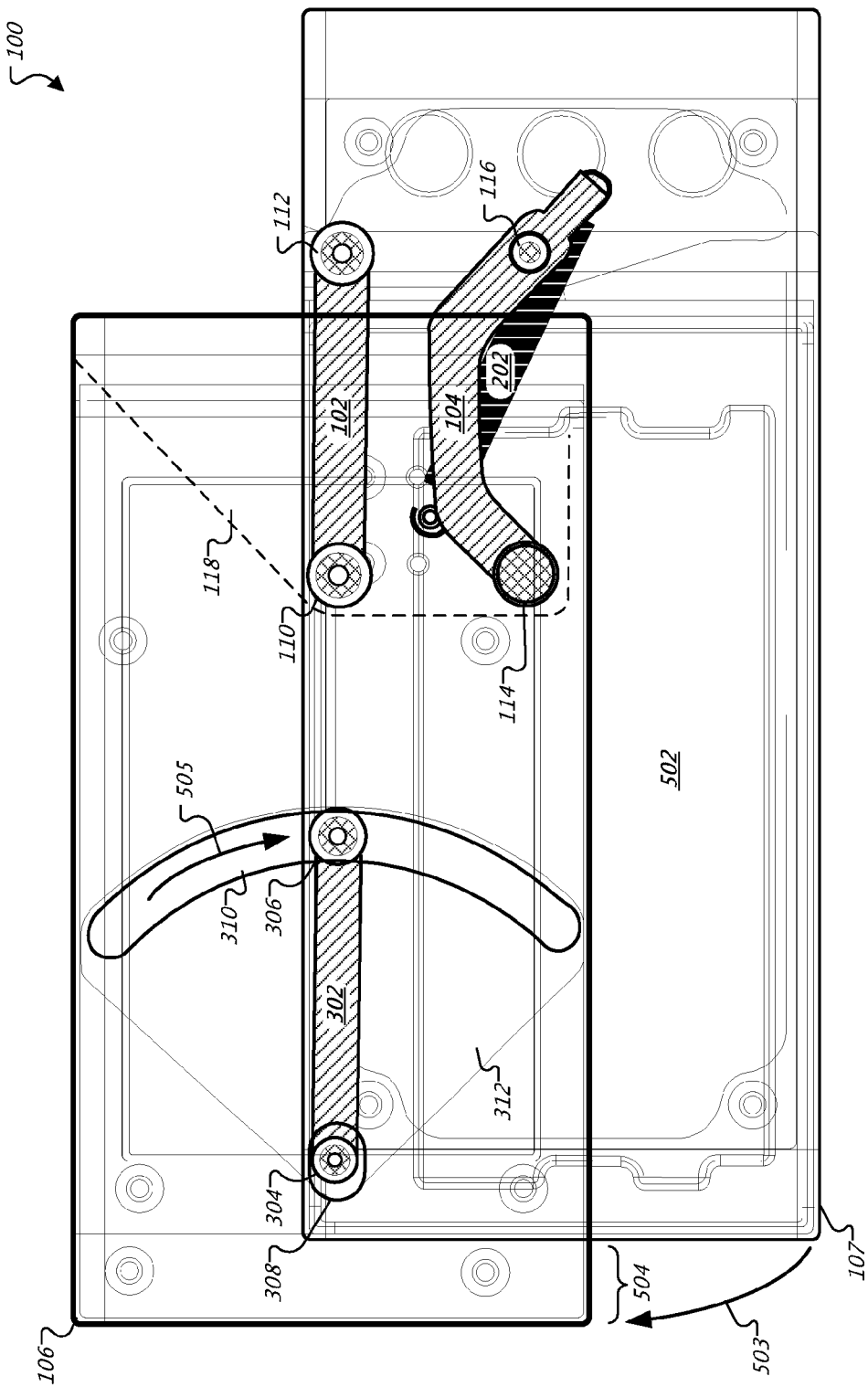
FIG. 5 is a schematic top view of an electronic device in a partially open position.

FIG. 5 is a schematic top view of an electronic device 100 in a partially open position. This position may be realized when the user opens the lid 106, for example, to expose a keyboard 502 on the device 100. As shown, the lid 106 is approximately half way open. The device 100 may obtain this state, for example, if the user first presses a button to release the lid 106 from the base 107, or simply slides the lid 106 upward. In some implementations, the device 100 may include a motor (not pictured) that automatically opens the lid 106 after a button or other control is selected.

In the partially open position of the device 100, the lid 106 slides upward and slightly leftward from the base 107, as indicated by directional arrow 503. By moving, the connecting components of the device 100 have changed positions with respect to the base 107. Specifically, the left sides of the bars 102 and 104 have moved upward and to the left (compare with FIG. 4). The left side of the stabilizing link 302 also moves upward and to the left from its starting position (e.g., when the lid 106 is fully closed). During this time, the pivots 110, 112, 114, 116, 304 and 306 have pivoted, allowing the bars 102, 104 and 302 to move into their new positions. An overhang 504 represents the outward movement by the lid 106 relative to the base 107 when the bars 102 and 104 and the link 302 are in these positions.

When the lid 106 is approximately half open, the bars 102 and 104 of the four-bar linkage are generally parallel with the upper edge of the base. Also, both the bars 102 and 104 have changed positions relative to the region 118. At the same time, the spring 202 stretches. This occurs because the spring's left end (anchored in the base 107) is now further way from its right end (also anchored in the base). Further, if the spring 202 is attached to the right end of the bar 104 (e.g., as described in reference to the extender 402 of FIG. 4), the spring 202 can be stretched further as the bar 104 moves. Essentially, the spring 202 is pulled to its maximum length and achieves its highest tension when the lid 106 is near or just past its half open position.

Similarly, the stabilizing link 302 is generally in an orientation parallel to the top or upper edge of the base when the lid 106 is approximately half open. In this position, the link 302 is still attached to the lid 106 at its left pivot 304 within the oval region 308. The link 302 is also attached to the base 107 at its right pivot 306. However, in this position, the top part of the right pivot 306 slides downward in an arc-shaped direction within the channel 310, as indicated by a directional arrow 505. The stabilizing link 302 provides a more stabile connection between the lid 106 and the base 107, even in a partially open position. Because the bar 102 and the link 302 in this position are generally in a straight line and less able to define the plane of operation, the bar 104 can serve to keep the lid 106 flat in relation to the base 107.

In some embodiments, the lid 106 moves in a direction parallel to a line formed by the centers of pivots 112 and 116. In some embodiments, the lid 106 moves in a direction perpendicular to the line formed by the centers of pivots 112 and 116. The line through pivots 112 and 116 remains stationary while a line through pivots 110 and 114 moves parallel to but up or down with respect to the line through pivots 112 and 116.

Figure 6:
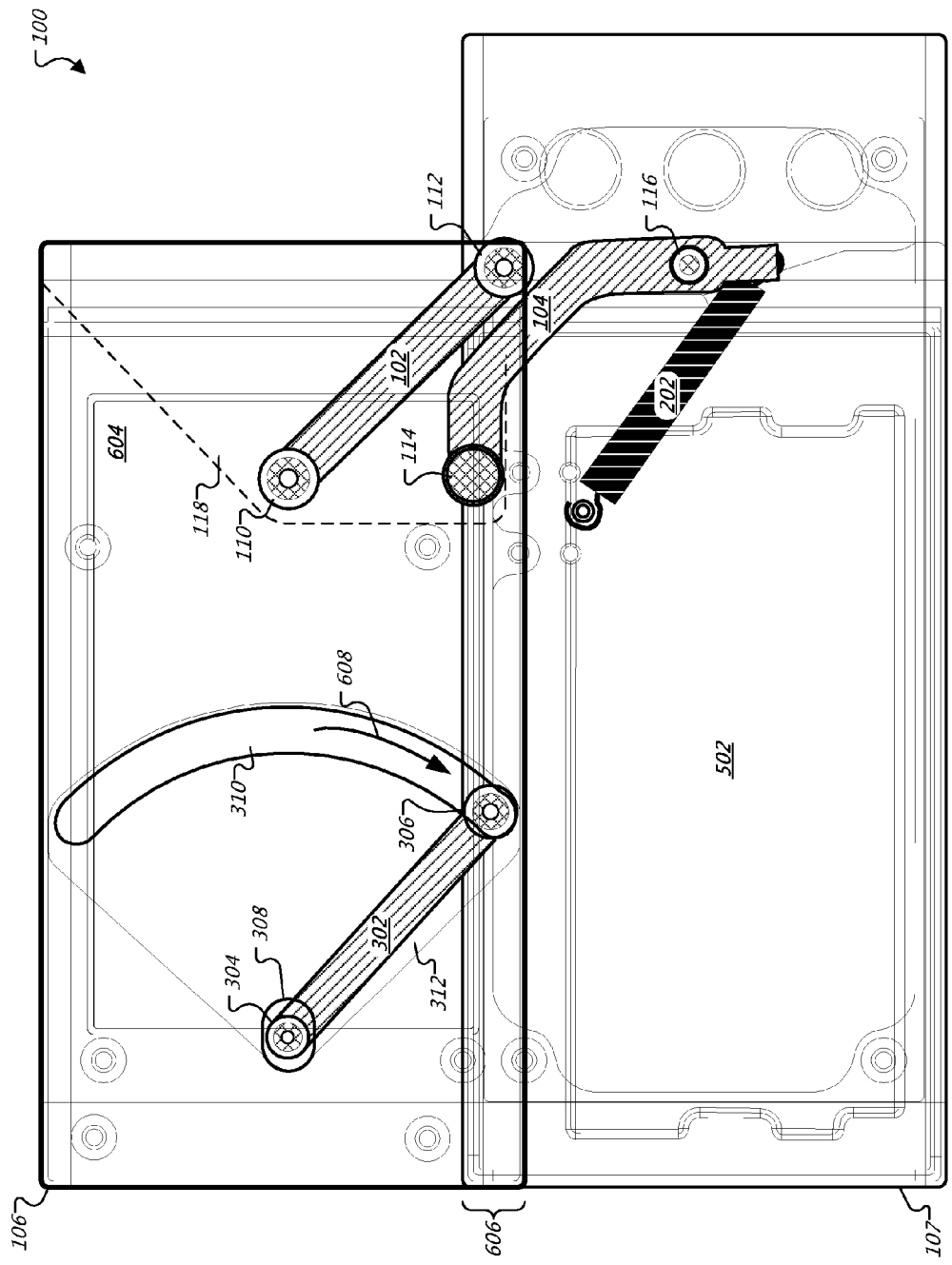
FIG. 6 is a schematic top view of an electronic device completely open.

FIG. 6 is a schematic top view of an electronic device completely open. In this position, the keyboard 502 is completely exposed. For example, when the keyboard 502 is available, the user of the device 100 may use the keyboard 502 for inputs which can correspond to displays on a screen 604. In some implementations, the screen 604 may be active initially or may become more visibly lighted when the device 100 reaches its fully open position.

The size of the keyboard 502 that can be housed in the base 107 and revealed when opening the lid 106 depends in part on the overlap 606. For example, if the overlap 606 is 15% of the base 107, then the bottom 85% of the base 107 can be used to house the keyboard 502. The overlap 606 can be 25% or less of the width of the device, such as less than 20%, 19%, 18%, 17%, 16%, 15% or 14%. Using a higher percentage of the base 107 for the keyboard can make it possible to incorporate larger keys and/or more keys within the keyboard. The overlap 606 can be reduced by making the pivots 112 and 306 smaller in diameter. This is especially true for the pivot 306 which is essentially shared between the lid 106 and the base 107. Specifically, while the pivot 306 is anchored to the base 107, its top portion fits entirely in the arc-shaped channel 310 of the lid 106.

The advantage of having a curve in the bar 104 is also depicted in FIG. 6. In particular, the bar 104 is not a straight-line connection between the pivots 114 and 116. Instead, the curve allows the bar 104 to curve around the keyboard 502. In this way, the footprint of the keyboard 502 on the base 107 can extend closer to the top edge of the base 107 and further to the right than would otherwise be possible with a straight bar 104.

In the fully open position of the device 100 depicted in FIG. 6, the left ends of the bars 102 and 104 are extended upwardly. Also, the bars 102 and 104 are now in different positions relative to the region 118. The bar 104, in particular, is at the lowest section of the region 118. The end of the bar 104 nearest the right pivot 116 is now pointed down. In this embodiment, the spring 202 is attached to the end of bar 104, the spring 202 is now in a less stretched state than in, for example, a generally half-open position. However, a slight but significant tension in the spring 202 can help keep the lid 106 in a fully open position.

Similarly, the stabilizing link 302 is oriented differently within the pie-shaped region 312 when the lid 106 is fully open. In this position, the top of the right pivot 306 slides downward in an arc-shaped direction within the channel 310, as indicated by directional arrow 608.

Figure 7:
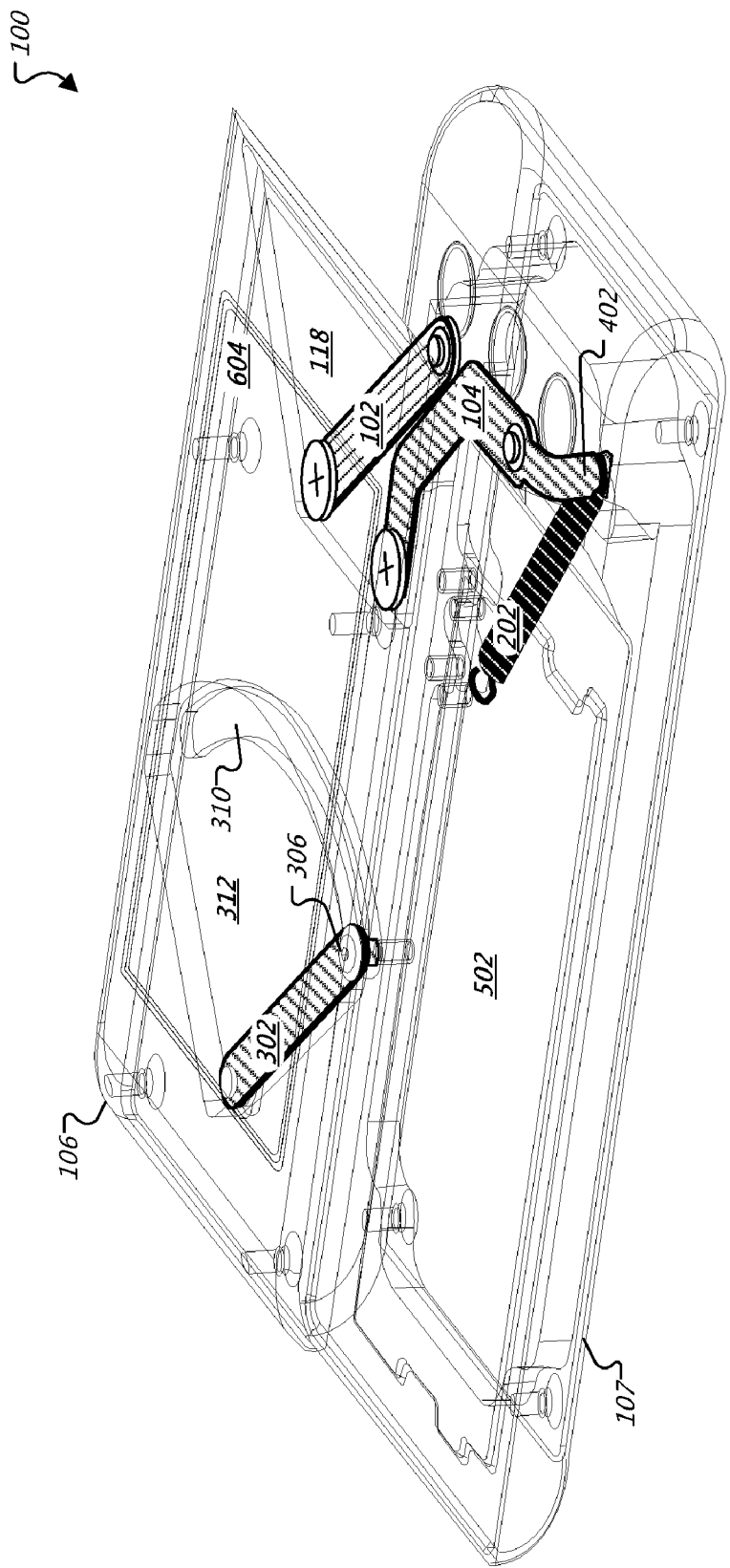
FIG. 7 is a schematic perspective view of an electronic device completely open.

FIG. 7 is a schematic perspective view of an electronic device 100 completely open. The perspective view provides a better picture of how the upper portion of the pivot 306 engages in the arc-shaped channel 310. In addition, the stabilizing link 302 is shown in the pie-shaped region 312. The bars 102 and 104 of the four-bar linkage fit within the region 118. Finally, the extender 402 attached to (or included as part of) the bar 104 is shown attached to the spring 202.

Moving the lid from the open to the closed device, or vice versa, the four-bar linkage does not move through a singularity point. The path of movement is continuous for each portion of the four-bar linkage. Therefore, a timing mechanism is not required for completing the opening or closing movement of the device.

Figure 8:
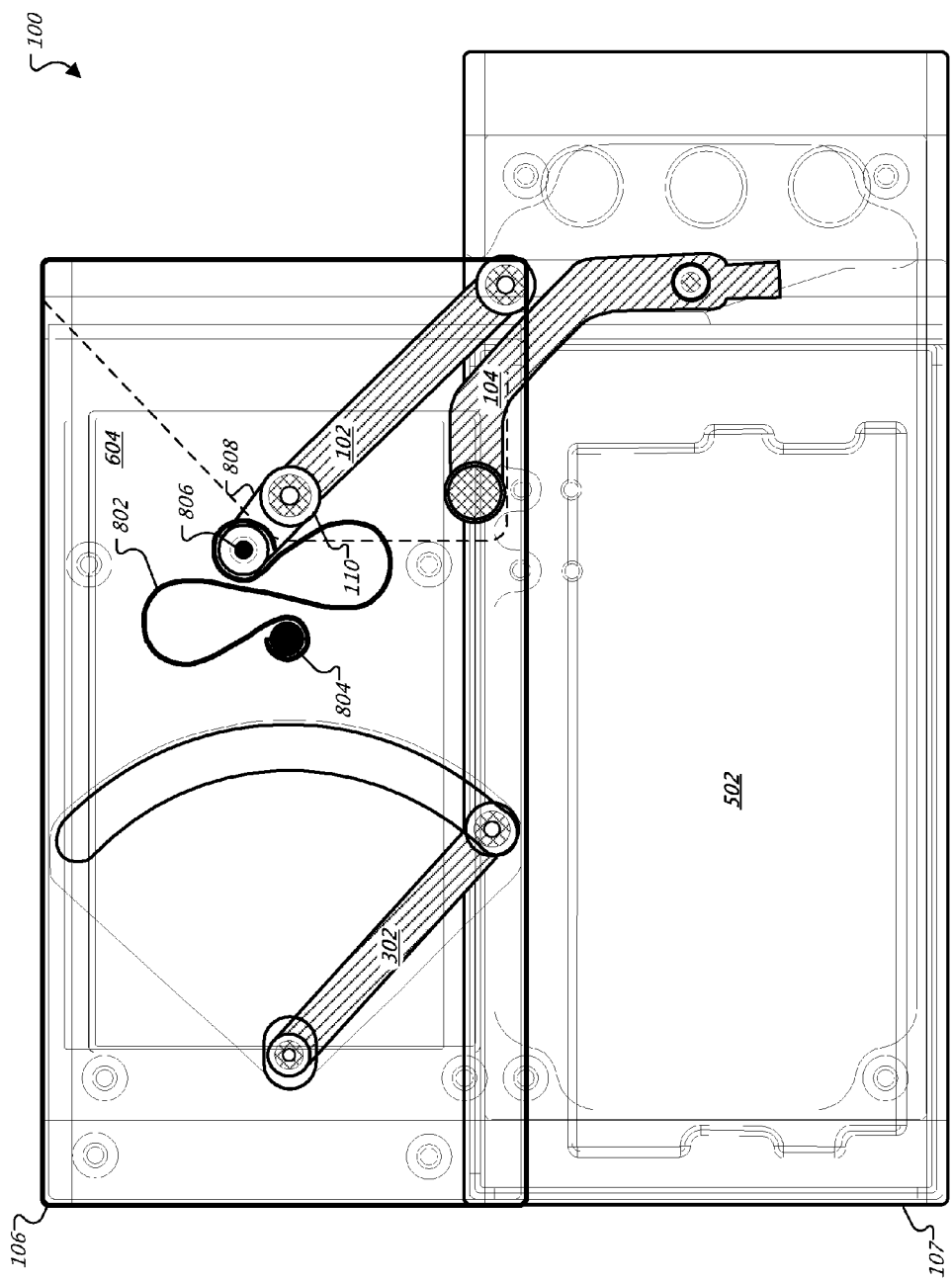
FIGS. 8 and 9 are schematic top views of an electronic device with a spring.
Figure 9:
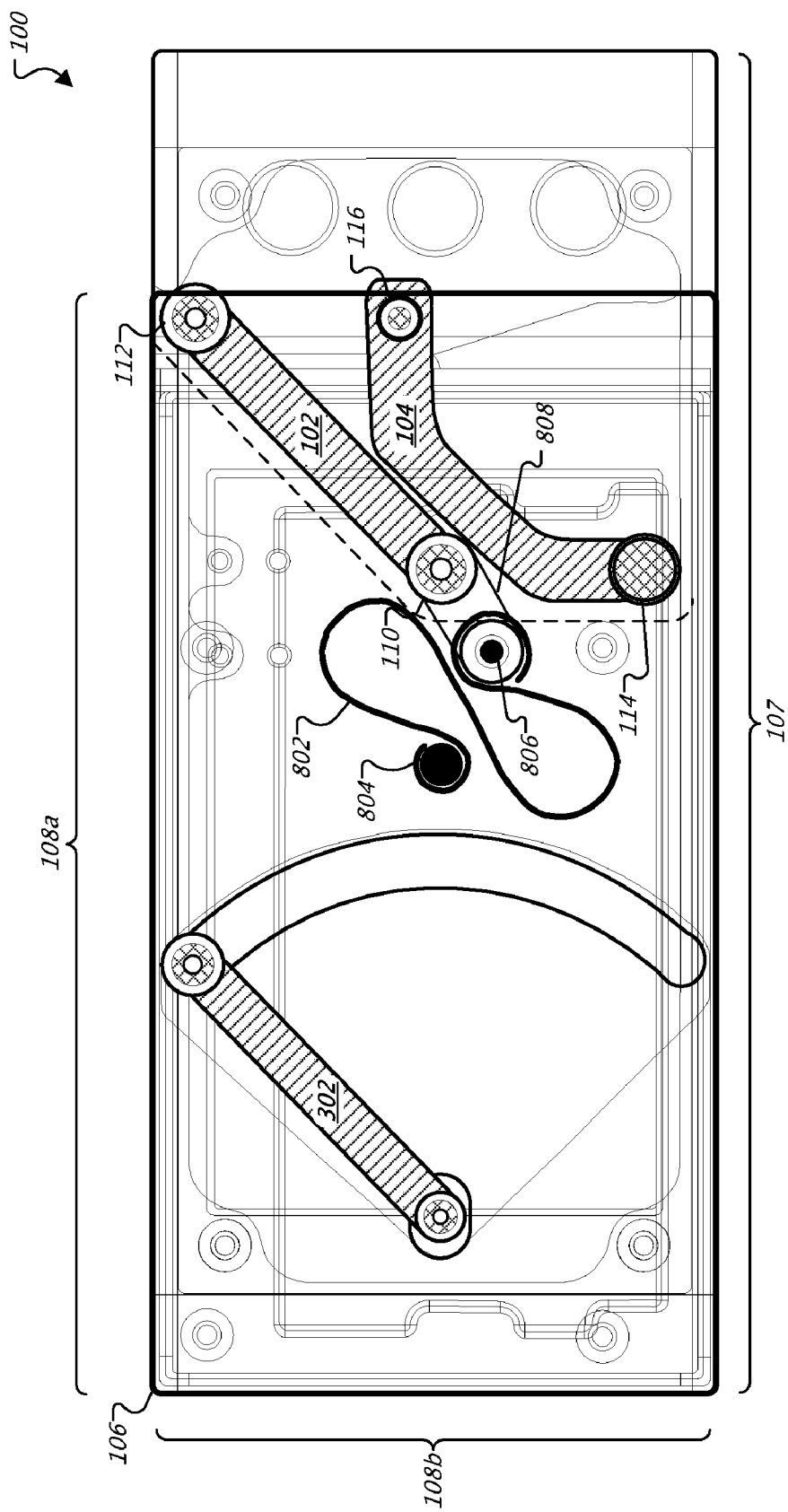

FIGS. 8 and 9 are a schematic top views of an electronic device 100 with a serpentine spring 802. The serpentine spring 802 can be used instead of the tension coil spring 202 described in reference to FIG. 2. In some implementations, both springs 202 and 802 can be used.

The serpentine spring 802 can be mounted entirely in the lid 106. Housing the spring 802 entirely in the lid 106 (e.g., instead of housing the spring 202 partially or completely in the base 107) can conserve space for the keyboard 502. The left end of the spring 802 wraps around a post 804, which is anchored in the lid 106. The right end of the spring 802 is connected to a mechanism that is in turn flexibly connected to bar 102. Alternatively, the spring 802 can be connected to a portion of the bar 102 that extends leftward from the pivot 110. In some embodiments, the right end of the spring 802 is wrapped around a mobile post 806. The post 806 is on the bar 102 and rotates as the display moves, compressing or releasing the spring. In some embodiments, a loop connector 808 attaches the mobile post 806 to the bar 102.

The spring 802 is in a non-compressed state or in a state where the least compression is placed on the spring 802 when the device 100 is in the fully open or fully closed position. As the lid 106 is moved from open to closed or closed to open, the ends of the spring 802 are pushed together, which compresses the spring. The higher tension placed on the device in the intermediate open state causes the positive open or positive close action.

In the implementation shown in FIGS. 8 and 9, the bar 104 and the stabilizing link 302 have the same length. As such, the parallelogram formed by their four pivots enable the lid 106 to move in a plane similar to that of the base 107, allowing the lid 106 to maintain the same orientation as the base 107. However, the bar 102 can have a different length than the bar 104 and the link 302.

Electrical connections from the base to the lid can be made through the bars 102, 104, or through other bars in the device. Alternatively, or in addition, an electrical connection can be made through a ribbon cable between the base and lid. The ribbon cable or a flexible printed circuit (FPC) can have multiple layers with air gaps to allow for additional flexibility. The FPC can also be attached to a linear slider between the base and display that dictates separate x-axis and y-axis service loops to address the swinging motion of the display. In some embodiments, the FPC is routed along one of the bars and has rotational service loops at either end. Memory and processing functions can be performed either in the base or the lid or both.

Figure 10:
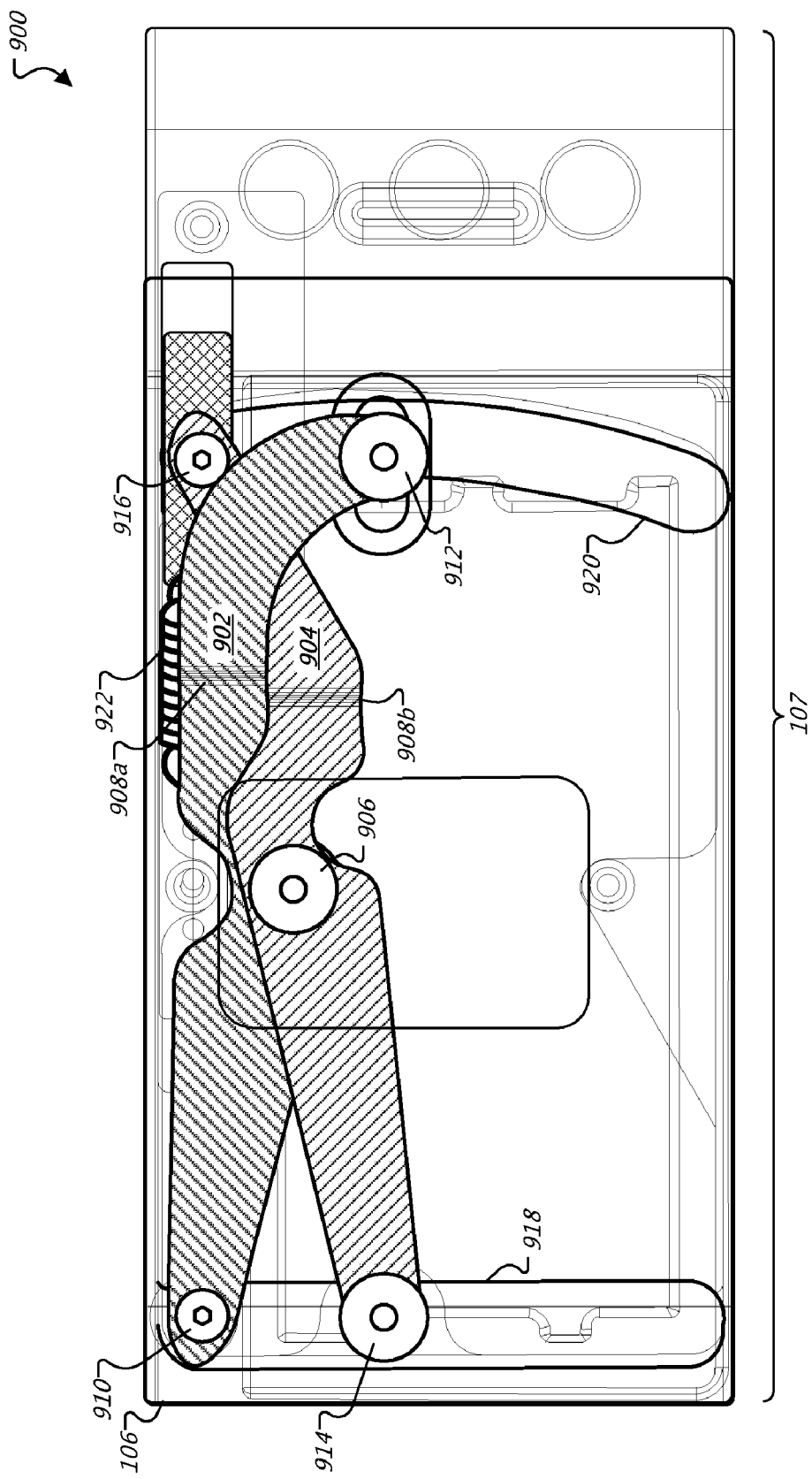
FIG. 10 is a schematic top view of an electronic device with a scissor hinge mechanism in a closed position.

FIG. 10 is a schematic top view of an electronic device with a scissor hinge mechanism in a closed position. For example, a device 900, such as a mobile phone or PDA, can use the scissor hinge mechanism to attach the lid 106 to the base 107. The scissor hinge mechanism can also allow the lid 106 to be opened and closed, parallel to the base 107. The scissor hinge mechanism can be used, for example, instead of the four-bar linkage of device 100 described in reference to FIGS. 1-9.

The scissor hinge mechanism includes a bottom blade 902 and a upper blade 904. A fulcrum 906 joins the two blades 902 and 904 in a scissors configuration. The designation of "top" and "bottom" with respect to the blades refers to the overlapping portions of the blades at the fulcrum 906. The fulcrum 906 acts as a hinge or pivot between the blades 902 and 904 as they operate in a scissors fashion. For example, the blades 902 and 904 can pivot at the fulcrum 906 whenever the lid 106 moves relative to the base 107, such as when the device 900 is opened or closed.

The blades 902 and 904 include bends 908a and 908b. The bends 908a and 908b provide elevation changes incorporated into the otherwise generally flat blades 902 and 904. The bends 908a and 908 allow the right end of scissors blade 902 to cross over the right end of scissor blade 904. The bends 908a and 908b allow the blades 902 and 904 to overlap when the device is closed, because the blade 902 is mounted below the blade 904 at the fulcrum 906. The bend 908a in the blade 902 is upward in the left-to-right direction, so that in the top view of FIG. 10 the right side of the blade 902 is closer to the top. This allows the right side of the blade 902 to cross over the top of the right side of the blade 904. Conversely, the bend 908b in the blade 904 is downward in a left-to-right direction. The bend 908b is opposite to that of the bend 908a working together with the bend 908a to change the elevations of the right sides of the blades 902 and 904. For example, in the fully closed position of the lid 106, the right side of the blade 902 is above the right side of the blade 904. Having generally equal (but opposite) bends in both blades 902 and 904 can reduce the space required to house the thickness of the scissors mechanism by combining the elevation changes at roughly the same elevation. In some implementations, more or fewer bends can be used, and the bends may be distributed along the blades in a different arrangement, such as on the other side of the fulcrum or only in one of the blades. In some embodiments, the anchoring and bends are opposite of that depicted in FIG. 10 and described herein.

The ends of the bottom blade 902 include pivots 910 and 912. The pivot 910 is attached to the base 107. The pivot 912 is attached to the lid 106. The ends of the upper blade 904 include pivots 914 and 916. The pivot 914 is attached to the lid 106. The pivot 916 is attached to the base 107. The tops of the pivots 910 and 916 slide along the bottom edge of the lid 106 in a straight channel 918 and an arc-shaped channel 920, respectively, during opening and closing operations. The pivots 910 and 916 are attached along the upper edge of the base 107. This enables the lid 106 to open more fully because the lid 106 overlaps the base 107 where the pivots 910 and 916 are attached to the base 107.

The device 900 includes a spring 922. The left end of the spring 922 is mounted to the base 107 along the top edge of the base 107. The right end of the spring 922 is attached, directly or indirectly, to the pivot 916 on the blade 904. Having the spring 922 attached to the scissors mechanism can provide a positive open and close operation of the lid 106. As depicted in FIG. 10, the spring 922 is a tension coil spring. However, other configurations of springs can be used, such as a compression spring mounted to the right of the pivot 916.

Figure 11:
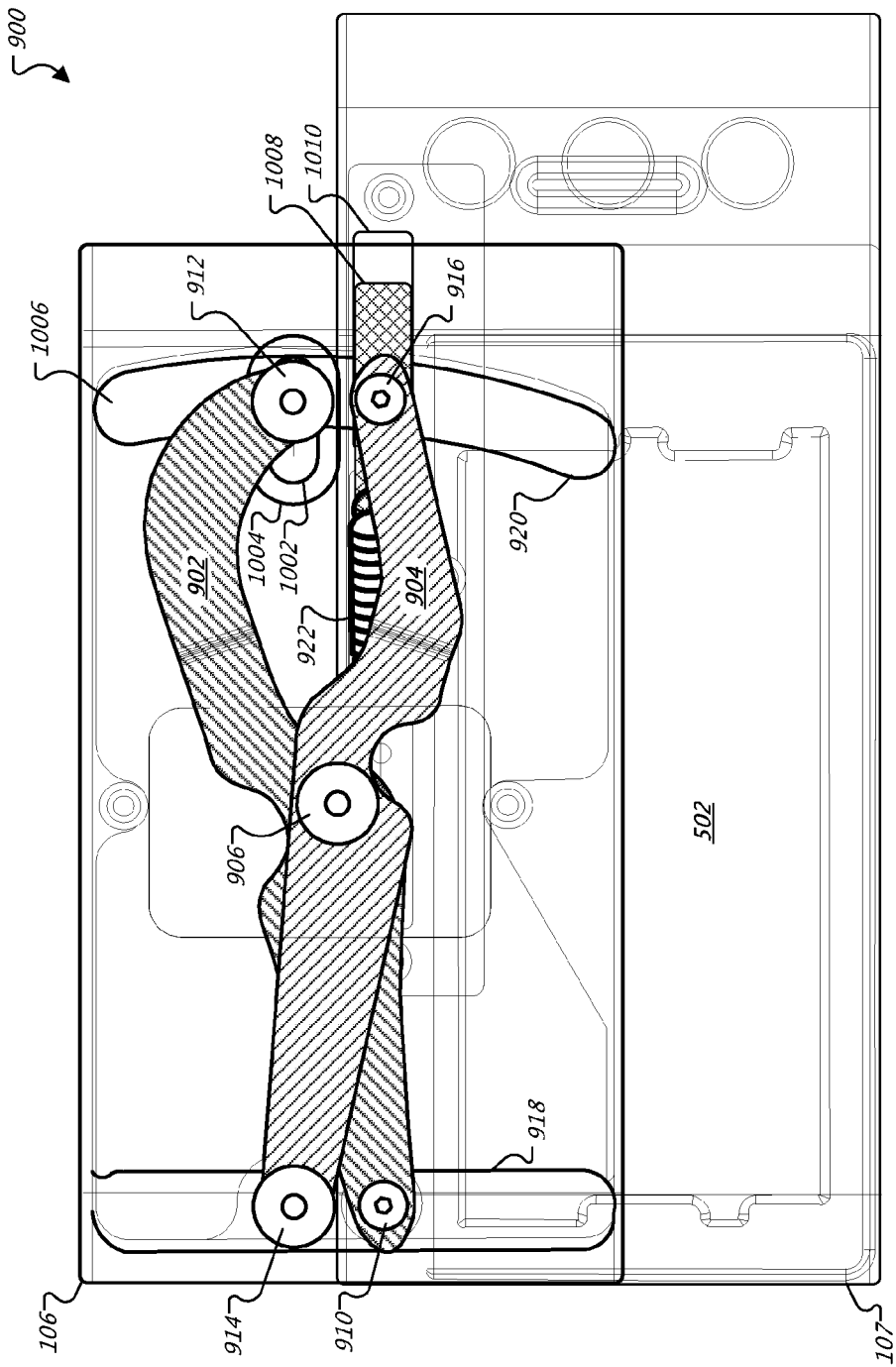
FIG. 11 is a schematic top view of an electronic device in a partially open position.

FIG. 11 is a schematic top view of an electronic device in a partially open position. In this position (e.g., approximately half-way open), the lid 106 is slid upward from the base 107 in a partially open state. The user of the device 900 can open the lid 106 in this fashion when, for example, when the user needs access to the keyboard 502 hidden below the lid 106.

In the partially open position of the device 900, the orientation of the scissors blades 902 and 904 is changed from the closed state. Specifically, the blade 902 rotates counterclockwise relative to the fulcrum 906. The far left end of the blade 902 crosses below the far left end of the blade 904. The result is that the pivot 910 is on the other side of the pivot 914. Specifically, while the pivot 910 is still anchored to the base 107, the upper part of the pivot 910 slides downward in the channel 918. Simultaneously, at the other end of the blade 902, the blade 902 pivots on the pivot 912 attached to the lid 106. To help the pivoting action, the lid 106 further contains a channel 1002 which can provide a left-to-right groove in which the pivot 912 can freely operate. The channel 1002 allows for horizontal movement of the pivot 912. The movement can occur because the horizontal distance between the pivots 910 and 912 changes as the scissors mechanism operates. The lid 106 also includes a wider cut-out area 1004 adjacent to the narrower channel 1002. The cut-out area 1004 can allow the larger head of the pivot 912 to operate freely in a left-to-right motion within the cut-out area 1004 as the pivot 912 slides through an arc-shaped channel 1006.

The blade 904 is also in a different orientation in the partially open position of the device 900 than in fully closed position. In particular, the blade 904 moves simultaneously with the blade 902 because they are attached at the fulcrum 906. To reach the partially open position of FIG. 11, the blade 904 rotates on the fulcrum 906 in a clockwise rotation, as compared to the counterclockwise rotation of the blade 902. At the far left end of the blade 904, the pivot 914 pivots where it is attached to the lid 106. At the same time, the pivot 916 at the far right end of the blade 904 also pivots. While the pivot 916 is anchored to the base 107, the top part of the pivot 916 slides downward in the channel 920. The channel 920 has an arc shape to account for the horizontal positional change of the pivot 916 during opening and closing of the lid 106. The pivot 916 is also attached to a slider 1008. When the blade 904 moves, the pivot 916 causes the slider 1008 to move left-to-right in a track 1010. In this way, the track 1010 absorbs the horizontal movement of the pivot 916 mounted in the base 107. During the movement of the slider 1008, the spring 922 attached to the slider 1008 expands and contracts. This can provide a positive open and close operation of the lid 106. Specifically, the spring 922 can exhibit its greatest expansion when the lid 106 is approximately half open, such as when the slider 1008 is slid to its rightmost position. Conversely, the spring 922 can be in significantly less expanded states when the lid 106 is fully open (or fully closed) and the slider 1008 is slid to its leftmost position.

Figure 12:
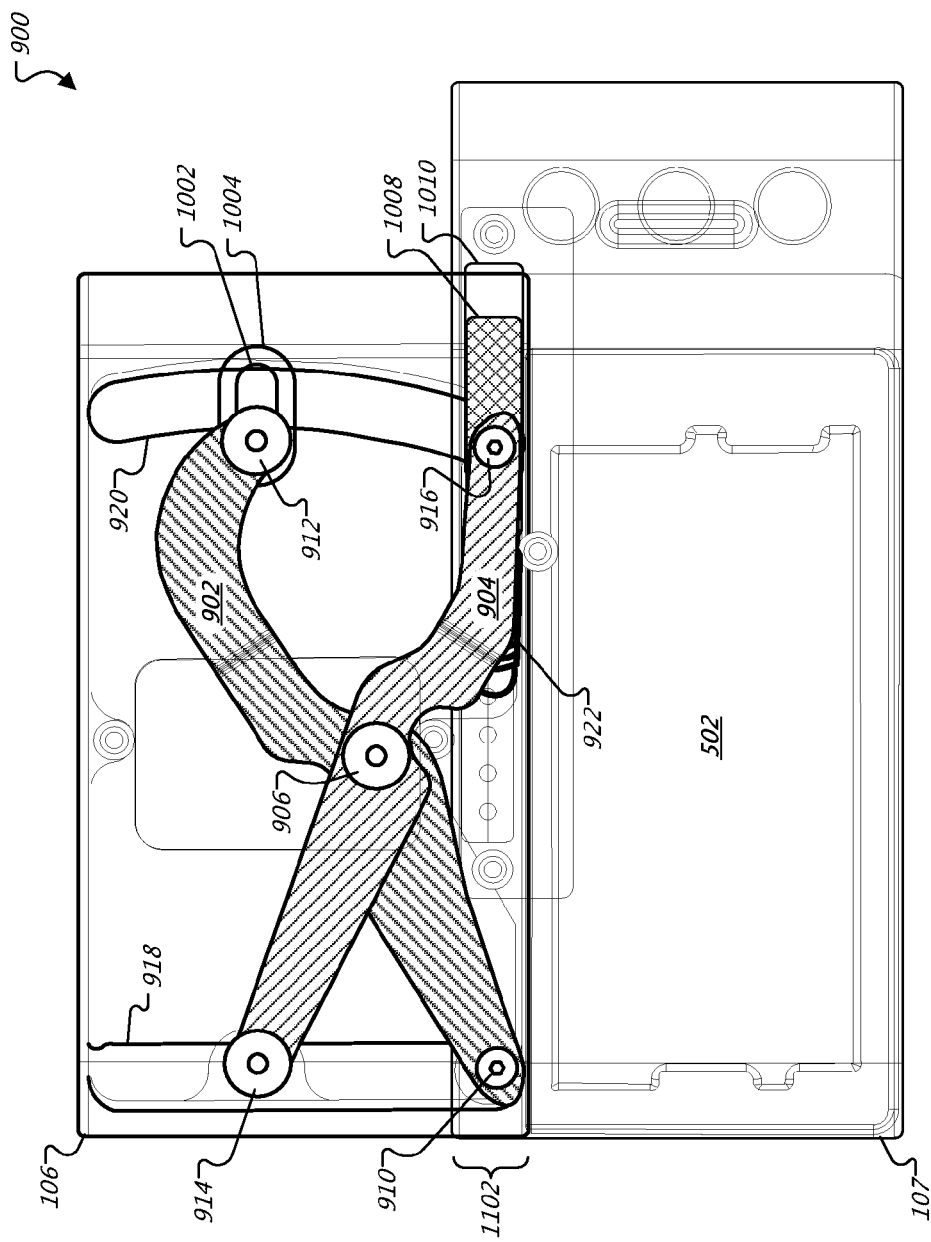
FIG. 12 is a schematic top view of an electronic device with the lid completely open.

FIG. 12 is a schematic top view of an electronic device with the lid completely open. In this position, the scissors mechanism is completely reversed from its fully closed position. In some embodiments, the pivots 910 and 914 are at their greatest distance apart in the open position. Similarly, in some embodiments the pivots 912 and 916 are at their greatest distance apart when the device is in the open configuration. The pivot 910 slides to the bottom of the channel 918, while the pivot 916 slides to the bottom of the channel 920. With the pivots 910 and 916 at the bottom edge of the underside of the lid 106, the lid 106 can be open to its maximum extent. The extent to which the lid 106 can open is limited by an overlap 1102 between the lid 106 and the base 107. The size of the overlap 1102 depends on how small particular components of the scissors mechanism are. Specifically, the size of the overlap 1102 can depend on the size of various parts, such as the pivots 910 and 916, the spring 922, the slider 1008, and the track 1010. By opening the lid 106 to a significantly larger extent than in conventional devices (e.g., 75%, with a 25% overlap 1102), the underlying keyboard 502 that is exposed can be made larger. In particular, larger keys and/or a greater number of keys can then be used, which can improve the usability of the device 900.

In the completely open position of the scissors mechanism, the pivots 912 and 916 are further to the left than in the partially open position depicted in FIG. 11. As such, the pivot 912 slides to the left end of the channel 1002. Also, the pivot 916 pulls the slider 1008 to a relatively farther-left position in the track 1010.

Figure 13:
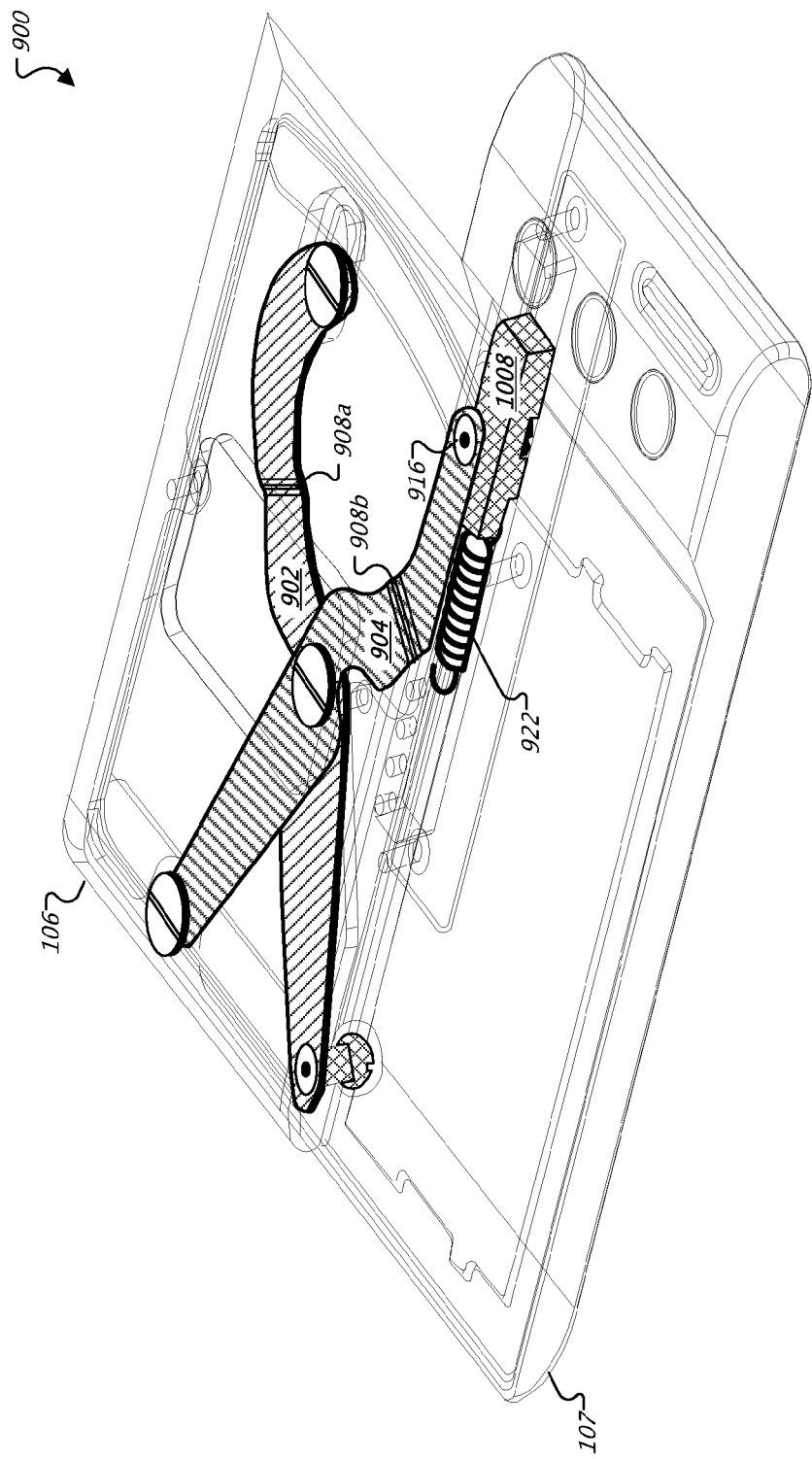
FIG. 13 is a schematic perspective view of an electronic device in a partially open position.

FIG. 13 is a schematic perspective view of an electronic device in a partially open position. In this view, the dog leg bends 908a and 908b are more evident, showing how the right end of the blade 902 is able to cross over the top of the right end of the blade 904. The slider 1008 is shown attached to the spring 922 and the pivot 916. In addition, the base 107 is shown with a cut-out portion where the lid 106 resides when the device 900 is closed.

Figure 14:
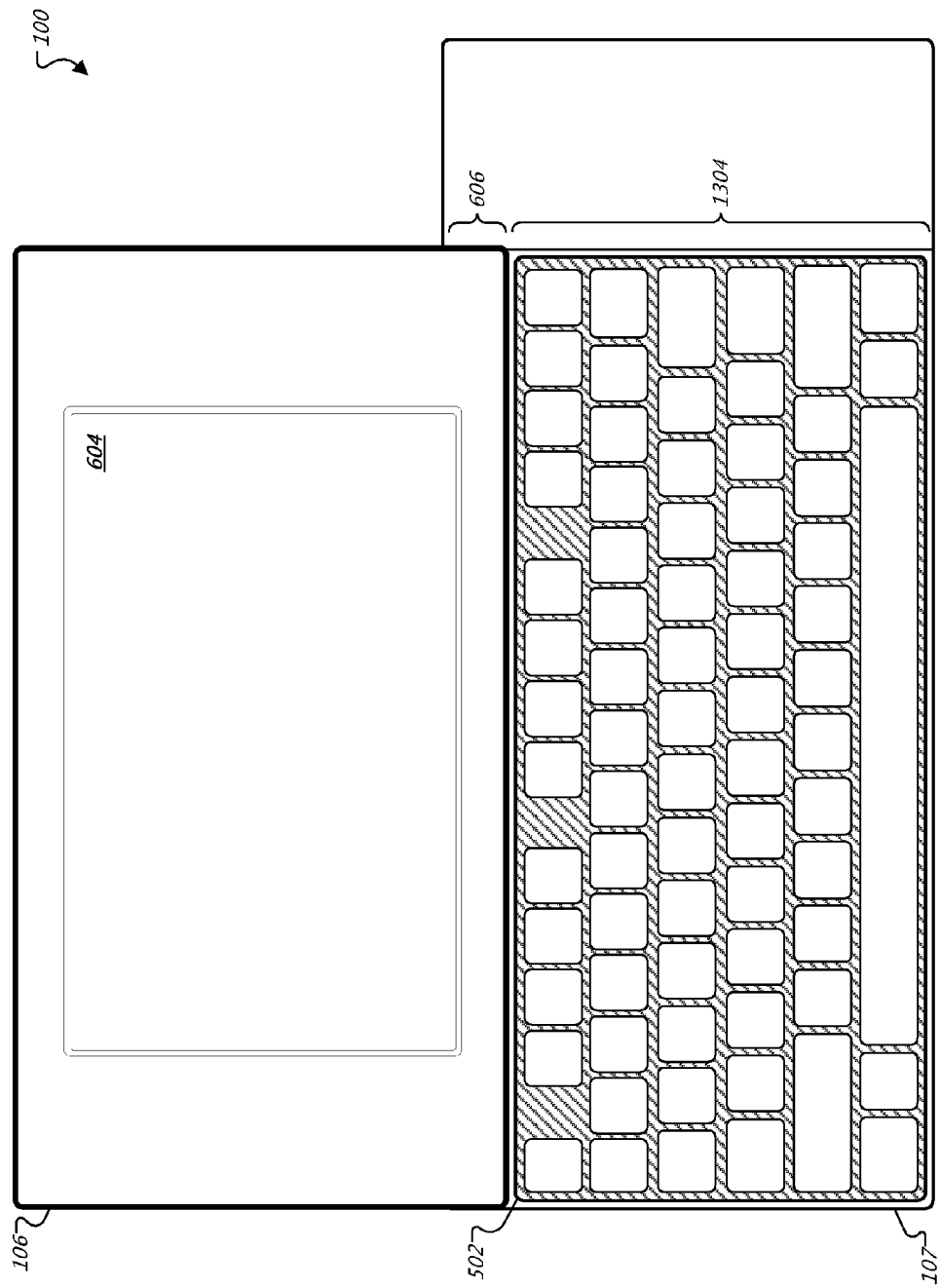
FIG. 14 is schematic top view of an electronic device with a keyboard.

FIG. 14 is schematic top view of an electronic device with a keyboard. The keyboard 502 can be revealed, for example, if the user opens the device 100. A similar keyboard can be used, for example, in the device 900 described in reference to FIG. 10. When the device is opened 100, the lid 106 slides away from the base 107, revealing a portion of the base having a height 1304. By minimizing the overlap 606 between the lid 106 and the base 107, the height 1304 can be greater. Having a greater height 1304 allows a taller keyboard 502 to be housed in the base 107.

The keyboard 502 can contain various combinations of keys, such as standard QWERTY or other layouts of letter keys, numeric keys or keypads, arrow keys, function keys, or other special keys. The keyboard can also include other displays or controls, such as a switch, touch screen, LED indicator, headphone port or other port, etc. Any of these features can also exist elsewhere on the devices 100 or 900. If the keyboard 502 contains keys that are too small to operate manually, the device 100 can also include a stylus or other tool for pressing the smaller keys. When not in use, such a stylus can be stored, for example, in a chamber or on clips built into the device 100. The keyboard 502 can also include other controls, such as a mouse or trackball, which the user can use in a graphical user interface (GUI). If the device 100 is too small to house a larger keyboard, a thumb-type mini keypad can be used. In such a mini keypad, each key can have several functions, and the total number of keys needed can be reduced. In this way, the user may be able to operate the keypad manually (e.g., without a stylus).

As noted above, the base can have controls that are always exposed, even when the keyboard 502 is covered by the lid 106. The surface in which the exposed controls are located can be substantially flush with the surface of the lid 106 when the device is closed.

In some embodiments, the thicker region of the base, i.e., corresponding to Bft in FIG. 1A, has an upper surface that is sloped. The surface can be sloped such that the portion of the thicker region that is adjacent to the lid is thinner than a portion of the thicker region at the end of the device. Alternatively, the portion at the end of the device can be thinner than the portion adjacent to the lid.

Any of the details described above can be used with any of the devices described herein. Further, the devices can include further components, such as a latch or detent for locking the device in an open or closed position. Also, the device include circuitry and electronics that allow the electronic device to operate in the desired fashion.

The devices described herein may include one or more of the following advantages. An electronic device with a lid and base can provide access to a user input device when desired and hide the user input device, protecting the device from receiving undesired input, when the input device is not needed. Such a device can also have a smaller footprint than a device with similarly sized features, e.g., a screen and user input device, that does not open and close. Hinges between the lid and base can enable the opening and closing action of the device. The hinges may be arranged in a way that minimizes the overlap between the base and lid when the device is open. The hinges can also provide stability to the device when the device is being opened or is in the open state. A stabilizing bar can be included in the device, which can further stabilize the lid when being opened or closed. Device stability can improve the feel of the device to the user. Device stability can also improve the robustness of the device and thereby improve the useful lifetime of the device. The hinges can be partially embedded in the lid and/or base. The embedding can protect a user's fingers from being pinched by the hinges. The embedding can also protect the hinges from debris. If the hinges are kept clean, the smooth action of hinges in motion can be preserved, further improving the user's tactile experience with the device and improving the useful life of the device. In devices that are provided with a spring, the lid can be positively held in the open or closed position. Holding the lid closed prevents the device from sliding open when it is desired to keep the device closed. Holding the lid open allows the user to use the device without having the device flip closed. The user can be required to apply force to initiate the closing and opening of the device.

A number of embodiments of the invention have been described. Nevertheless, it will be understood that various modifications may be made without departing from the spirit and scope of the invention. For example, all of the devices described herein can be formed as a mirror image of the devices shown in the figures. Accordingly, other embodiments are within the scope of the following claims.

What is claimed is:

1. A mobile communication device comprising:
   a base;
   a lid; and
   a connector between the base and the lid comprising two bars, each bar including a first end pivotably connected to the lid and a second end pivotably connected to the base, wherein the lid is moveable between a first position and a second position, when the lid is in the first position the lid covers at least a portion of the base and when the lid is in the second position, the portion of the base is exposed, as the lid moves from the first position to the second position, the lid moves in a plane parallel to a main surface of the base,
   wherein one bar of the two bars includes a bend and the lid covers only a portion of the bar including the bend when the lid is in the second position, and
   wherein the bend of the bar including the bend is substantially contained in a plane parallel to, and in between, the base and lid.

2. The device of claim 1, wherein the two bars are pivotable in a plane parallel to the main surface of the base.

3. The device of claim 1, wherein one bar of the two bars is linear.

4. The device of claim 1, further comprising a spring within the lid.

5. The device of claim 4, wherein the spring is serpentine shaped.

6. The device of claim 5, wherein when the lid is between the first position and the second position, the spring is compressed.

7. The device of claim 1, further comprising a spring within the base.

8. The device of claim 7, wherein the spring is connected to one of the two bars.

9. The device of claim 8, wherein moving the lid from the first position to the second position causes the spring to extend.

10. The device of claim 1, further comprising a link to stabilize the lid as the lid is moved relative to the base.

11. The device of claim 10, wherein the link has a first end pivotably connected to the lid and a second end pivotably connected to the base, wherein the end pivotably connected to the base is slidably connected to the lid.

12. The device of claim 11, wherein the device is configured so that the end slidably connected to the lid slides in an arc-like motion.

13. The device of claim 1, wherein the two bars pivot in a scissor-like motion as the lid is moved with respect to the base.

14. The device of claim 1, wherein the lid includes a display.

15. The device of claim 14, wherein the base includes a keyboard.

16. The device of claim 14, wherein the base includes a speaker.

17. A mobile communication device comprising:
   a base having an upper surface, a lower surface, a width, a length, and a height, wherein the height changes along the length forming a thin region and a thick region, wherein the upper surface in the thin region is not coplanar with the upper surface in the thick region and the thick region has an input control for controlling the electronic device;
   a cover having a length and a width and that is slidably connected to the base such that in a first position at least 90% of a lower surface of the cover is adjacent to the upper surface of the thin region and in a second position at least 75% of the lower surface of the cover is not adjacent to the upper surface of the thin region; and
   a connector between the base and the cover, the connector comprising two bars with each bar including a first end pivotably connected to the cover and a second end pivotably connected to the base.

18. The device of claim 17, wherein the input control is configured to send electronic signals to control the device.

19. The device of claim 17, wherein when the cover is in both the first position and the second position a center line along the length of the cover is parallel with a center line along the length of the base.

20. The device of claim 19, wherein when the cover is in both the first position and the second position a center line along the width of the cover is parallel with a center line along the width of the base.

21. The device of claim 17, wherein the cover is slidable along a plane parallel to a plane of the base.

22. The device of claim 21, wherein the cover is prevented from rotating out of the plane parallel to the plane of the base.

23. The device of claim 17, wherein the first position is a fully closed position and the second position is a fully open position.

24. The device of claim 17, wherein when the cover is moved from an open position to a closed position, a centerline of the cover along the width does not rotate with respect to a centerline of the base along the width.

25. The device of claim 1, wherein the plane parallel to the main surface of the base is a first plane, and when the lid is in the first position, the lid covers the main surface of the base and when the lid is in the second position, the main surface of the base is exposed, as the lid moves from the first position to the second position, the lid remains in the first plane while the base remains in a second plane separate from and parallel to the first plane.

26. The device of claim 17, wherein one bar of the two bars includes a bend and the cover conceals only a portion of the bar including the bend when the cover is in the second position.

27. The device of claim 1, wherein as the lid moves from the first position to the second position, the lid moves only in a plane parallel to a main surface of the base.

28. The device of claim 17, further comprising a link to stabilize the cover as the cover is moved relative to the base, wherein the link has a first end pivotably connected to the cover and a second end pivotably connected to the base, wherein the end pivotably connected to the base is slidably connected to the cover.

29. The device of claim 17, wherein a plane parallel to the upper surface of the base is a first plane, and the cover covers at least a portion of the lower surface of the base in a first position, and the cover exposes the portion of the lower surface of the base in the second position, and as the cover moves from the first position to the second position, the cover remains in the first plane while the base remains in a second plane separate from and parallel to the first plane.

30. A mobile communication device comprising:
a base;
a lid; and
a connector between the base and the lid comprising two bars, each bar including a first end pivotably connected to the lid and a second end pivotably connected to the base, wherein the lid is moveable between a first position and a second position, when the lid is in the first position the lid covers at least a portion of the base and when the lid is in the second position, the portion of the base is exposed, as the lid moves from the first position to the second position, the lid moves in a plane parallel to a main surface of the base,
wherein one bar of the two bars includes a bend and the lid covers only a portion of the bar including the bend when the lid is in the second position, and
wherein the plane parallel to the main surface of the base is a first plane, and when the lid is in the first position, the lid covers the main surface of the base and when the lid is in the second position, the main surface of the base is exposed, as the lid moves from the first position to the second position, the lid remains in the first plane while the base remains in a second plane separate from and parallel to the first plane.

31. A mobile communication device comprising:
a base;
a lid;
a connector between the base and the lid comprising two bars, each bar including a first end pivotably connected to the lid and a second end pivotably connected to the base, wherein the lid is moveable between a first position and a second position, when the lid is in the first position the lid covers at least a portion of the base and when the lid is in the second position, the portion of the base is exposed, as the lid moves from the first position to the second position, the lid moves in a plane parallel to a main surface of the base; and
a link to stabilize the lid as the lid is moved relative to the base, wherein the link has a first end pivotably connected to the lid and a second end pivotably connected to the base, wherein the end pivotably connected to the base is slidably connected to the lid,
wherein one bar of the two bars includes a bend and the lid covers only a portion of the bar including the bend when the lid is in the second position.

* * * * *